United States Patent
Chen et al.

(10) Patent No.: US 11,137,929 B2
(45) Date of Patent: Oct. 5, 2021

(54) STORAGE SYSTEM CONFIGURED TO SUPPORT CASCADE REPLICATION

(71) Applicant: EMC IP Holding Company LLC, Hopkinton, MA (US)

(72) Inventors: Xiangping Chen, Sherborn, MA (US); Aharon Blitzer, Shoham (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 86 days.

(21) Appl. No.: 16/448,681

(22) Filed: Jun. 21, 2019

(65) Prior Publication Data
US 2020/0401314 A1  Dec. 24, 2020

(51) Int. Cl.
  *G06F 3/00* (2006.01)
  *G06F 3/06* (2006.01)
  *G06F 11/14* (2006.01)

(52) U.S. Cl.
  CPC .............. *G06F 3/065* (2013.01); *G06F 3/067* (2013.01); *G06F 3/0617* (2013.01); *G06F 3/0665* (2013.01); *G06F 11/1448* (2013.01)

(58) Field of Classification Search
None
See application file for complete search history.

(56) References Cited

U.S. PATENT DOCUMENTS 6,317,754 B1 * 11/2001 Peng ..................... H04L 29/06
                                                              707/610
7,165,155 B1   1/2007 Duprey et al.
7,440,982 B2  10/2008 Lu et al.
7,444,464 B2  10/2008 Urmston et al.
(Continued)

FOREIGN PATENT DOCUMENTS

WO        2016111954 A1   7/2016
WO  PCT/US2019/024885    1/2020
WO  PCT/US2019/024900    1/2020
WO        2020204880 A1  10/2020
WO        2020204882 A1  10/2020

OTHER PUBLICATIONS

EMC Corporation, "Introduction to the EMC XtremIO Storage Array (Ver. 4.0): A Detailed Review," White Paper, Apr. 2015, 65 pages.
EMC Corporation, "Unstoppable Data Reduction: Always-on, In-Line, Zero-Penalty, Enterprise-Class, Free,"https://store.emc.com/xtremio, Jul. 2014, 2 pages.

(Continued)

*Primary Examiner* — Craig S Goldschmidt
(74) *Attorney, Agent, or Firm* — Ryan, Mason & Lewis, LLP

(57) ABSTRACT

An apparatus is configured to initiate a first replication session to replicate data of a first consistency group in a first storage system to a second consistency group in a second storage system, to create an additional consistency group linked to the second consistency group in the second storage system, and to initiate a second replication session to replicate data of the additional consistency group to another consistency group in a third storage system. The additional consistency group linked to the second consistency group in some embodiments is periodically updated against the second consistency group. For example, in one or more embodiments the second consistency group is updated based at least in part on an active snapshot set of the first replication session, and the additional consistency group is updated based at least in part on the second consistency group.

20 Claims, 10 Drawing Sheets

(56) References Cited

U.S. PATENT DOCUMENTS

| | | |
|---|---|---|
| 8,095,726 B1 | 1/2012 | O'Connell et al. |
| 8,214,612 B1 | 7/2012 | Natanzon |
| 8,301,593 B2 | 10/2012 | Hoffmann et al. |
| 8,332,354 B1* | 12/2012 | Chatterjee .......... G06F 11/1461 707/624 |
| 8,335,899 B1 | 12/2012 | Meiri et al. |
| 9,104,326 B2 | 8/2015 | Frank et al. |
| 9,208,162 B1 | 12/2015 | Hallak et al. |
| 9,286,003 B1 | 3/2016 | Hallak et al. |
| 9,304,889 B1 | 4/2016 | Chen et al. |
| 9,514,014 B2 | 12/2016 | Webman et al. |
| 9,552,258 B2 | 1/2017 | Hallak et al. |
| 9,606,870 B1 | 3/2017 | Meiri et al. |
| 9,614,909 B2 | 4/2017 | Yochai et al. |
| 9,716,754 B2 | 7/2017 | Swift |
| 9,891,994 B1 | 2/2018 | Schneider et al. |
| 9,934,302 B1* | 4/2018 | Cohen .................. G06F 16/273 |
| 10,176,046 B1 | 1/2019 | Hu et al. |
| 10,261,693 B1 | 4/2019 | Schneider et al. |
| 10,324,640 B1 | 6/2019 | Chen et al. |
| 10,338,851 B1 | 7/2019 | Kronrod et al. |
| 10,359,965 B1 | 7/2019 | Stronge et al. |
| 10,394,485 B1 | 8/2019 | Chen et al. |
| 10,437,501 B1 | 10/2019 | Kucherov et al. |
| 10,437,855 B1 | 10/2019 | Stronge et al. |
| 10,466,925 B1 | 11/2019 | Blanco et al. |
| 10,496,324 B2 | 12/2019 | Meiri et al. |
| 10,496,489 B1 | 12/2019 | Chen et al. |
| 10,496,672 B2 | 12/2019 | Meiri et al. |
| 10,558,613 B1 | 2/2020 | Shveidel et al. |
| 10,592,159 B2 | 3/2020 | Kucherov et al. |
| 10,592,161 B1 | 3/2020 | Chen et al. |
| 10,606,519 B1 | 3/2020 | Shveidel |
| 10,635,533 B2 | 4/2020 | Schneider et al. |
| 10,684,915 B2 | 6/2020 | Schneider et al. |
| 10,691,355 B2 | 6/2020 | Kucherov et al. |
| 10,691,373 B2 | 6/2020 | Harduf et al. |
| 10,691,551 B2 | 6/2020 | Meiri et al. |
| 10,698,772 B2 | 6/2020 | Hu et al. |
| 10,705,965 B2 | 7/2020 | Shveidel et al. |
| 10,719,253 B2 | 7/2020 | Alkalay et al. |
| 10,725,855 B2 | 7/2020 | Shani et al. |
| 10,754,559 B1 | 8/2020 | Meiri et al. |
| 10,754,575 B2 | 8/2020 | Stronge |
| 10,754,736 B2 | 8/2020 | Shani et al. |
| 10,761,933 B2 | 9/2020 | Moore et al. |
| 10,783,038 B2 | 9/2020 | Moore et al. |
| 10,817,385 B2 | 10/2020 | Meiri et al. |
| 2001/0047412 A1* | 11/2001 | Weinman, Jr. ....... G06F 11/2058 709/225 |
| 2005/0198455 A1 | 9/2005 | Yagawa et al. |
| 2007/0022121 A1 | 1/2007 | Bahar et al. |
| 2007/0220223 A1 | 9/2007 | Boyd et al. |
| 2007/0234108 A1 | 10/2007 | Cox et al. |
| 2008/0072000 A1* | 3/2008 | Osaki .................. G06F 11/2094 711/162 |
| 2008/0279462 A1 | 11/2008 | Celi, Jr. |
| 2009/0132955 A1 | 5/2009 | Garg et al. |
| 2009/0276593 A1 | 11/2009 | Jacobson et al. |
| 2010/0179941 A1 | 7/2010 | Agrawal et al. |
| 2011/0022566 A1 | 1/2011 | Beaverson et al. |
| 2011/0225123 A1 | 9/2011 | D'Souza et al. |
| 2012/0079224 A1 | 3/2012 | Clayton et al. |
| 2012/0124282 A1 | 5/2012 | Frank et al. |
| 2013/0042083 A1 | 2/2013 | Mutalik et al. |
| 2013/0305002 A1 | 11/2013 | Hallak et al. |
| 2013/0325824 A1 | 12/2013 | Shoens |
| 2014/0181016 A1 | 6/2014 | Whitehead et al. |
| 2014/0244935 A1 | 8/2014 | Ezra et al. |
| 2015/0378766 A1 | 12/2015 | Beveridge et al. |
| 2015/0378785 A1 | 12/2015 | Tarasuk-Levin et al. |
| 2016/0150012 A1 | 5/2016 | Barszczak et al. |
| 2016/0170987 A1 | 6/2016 | Kesselman |
| 2016/0202927 A1 | 7/2016 | Klarakis et al. |
| 2016/0224259 A1 | 8/2016 | Ahrens et al. |
| 2016/0261513 A1 | 9/2016 | Aingaran et al. |
| 2016/0345207 A1 | 11/2016 | Kwak et al. |
| 2017/0075842 A1 | 3/2017 | Su et al. |
| 2017/0083409 A1 | 3/2017 | Iwasaki et al. |
| 2017/0185323 A1 | 6/2017 | Kaushik et al. |
| 2017/0185529 A1 | 6/2017 | Chhabra et al. |
| 2017/0192857 A1 | 7/2017 | Meiri et al. |
| 2017/0315728 A1 | 11/2017 | Zheng et al. |
| 2018/0059964 A1* | 3/2018 | Narayanam ........... G06F 3/0689 |
| 2018/0095873 A1 | 4/2018 | Nakagoe et al. |
| 2019/0303010 A1 | 10/2019 | Meiri et al. |
| 2019/0303490 A1 | 10/2019 | Chen et al. |
| 2019/0370354 A1 | 12/2019 | Kucherov et al. |
| 2019/0370355 A1 | 12/2019 | Kucherov et al. |
| 2019/0370356 A1 | 12/2019 | Kucherov et al. |
| 2019/0370357 A1 | 12/2019 | Kucherov et al. |
| 2019/0392060 A1 | 12/2019 | Meiri et al. |
| 2020/0026616 A1 | 1/2020 | Hu et al. |
| 2020/0097174 A1 | 3/2020 | Moore et al. |
| 2020/0097363 A1 | 3/2020 | Moore et al. |
| 2020/0097393 A1 | 3/2020 | Moore et al. |
| 2020/0125276 A1 | 4/2020 | Shani et al. |
| 2020/0218601 A1 | 7/2020 | Schneider et al. |
| 2020/0218610 A1 | 7/2020 | Schneider et al. |
| 2020/0225849 A1 | 7/2020 | Meiri et al. |
| 2020/0226023 A1 | 7/2020 | Meiri |
| 2020/0226145 A1 | 7/2020 | Meiri |
| 2020/0233704 A1 | 7/2020 | Alkalay et al. |
| 2020/0233705 A1 | 7/2020 | Alkalay et al. |
| 2020/0233881 A1 | 7/2020 | Harduf et al. |
| 2020/0242130 A1 | 7/2020 | Chen et al. |
| 2020/0249868 A1 | 8/2020 | Glimcher et al. |
| 2020/0249869 A1 | 8/2020 | Glimcher et al. |
| 2020/0250089 A1 | 8/2020 | Kamran et al. |
| 2020/0250144 A1 | 8/2020 | Natanzon et al. |
| 2020/0272542 A1 | 8/2020 | Meiri et al. |
| 2020/0272600 A1 | 8/2020 | Natanzon et al. |
| 2020/0285268 A1 | 9/2020 | Meiri et al. |
| 2020/0285402 A1 | 9/2020 | Meiri et al. |
| 2020/0301784 A1 | 9/2020 | Chen |
| 2020/0310649 A1 | 10/2020 | Chen et al. |
| 2020/0310654 A1 | 10/2020 | Meiri et al. |
| 2020/0326877 A1 | 10/2020 | Chen et al. |
| 2020/0327024 A1 | 10/2020 | Alkalay et al. |

OTHER PUBLICATIONS

EMC Corporation, "Introduction to XtremIO Virtual Copies," White Paper, Mar. 2016, 39 pages.

EMC Corporation, "XtremIO Data Production (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data integrity in the XtremIO Architecture," White Paper, Apr. 2015, 28 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

Y. Zhang et al., "End-to-End Integrity for File Systems: A ZFS Case Study," Proceedings of the 8th USENIX Conference on File and Storage Technologies (FAST), Feb. 23-26, 2010, 14 pages.

Itzikr, "DellEMC XtremIO X2/X1 Management, Part 1, The CAS Architecture = Simplicity?," https://xtremio.me/2017/05108/dellemc-

(56) References Cited

OTHER PUBLICATIONS xtremio-x2x1-mnanagement-part-1-the-cas-architecture-simplicity/, May 8, 2017, 6 pages.

Itzikr, "DellEMC XtremIO X2 Tech Preview #2—Native Replication," https://xtremio.me/2017/05109/dellemc-xtremio-x2-tech-preview-2-native-replication/, May 9, 2017, 8 pages.

U.S. Appl. No. 16/357,957 filed in the name of Xiangping Chen dated Mar. 19, 2019 and entitled "Storage System with Differential Scanning of Non-Ancestor Snapshot Pairs in Asynchronous Replication."

U.S. Appl. No. 15/941,177 filed in the name of David Meiri et al. dated Mar. 30, 2018 and entitled "Storage System with Concurrent Fan-Out Asynchronous Replication Using Decoupled Replication Sessions."

U.S. Appl. No. 15/662,708 filed in the name of Xianping Chen et al. dated Jul. 28, 2017 and entitled "Token-Based Data Flow Control in a Clustered Storage System."

U.S. Appl. No. 15/662,809 filed in the name of William Stronge et al. dated Jul. 28, 2017 and entitled "Automatic Verification of Asynchronously Replicated Data."

U.S. Appl. No. 15/662,833 filed in the name of William Stronge et al. dated Jul. 28, 2017 and entitled "Signature Generator for Use in Comparing Sets of Data in a Content Addressable Storage System."

U.S. Appl. No. 15/793,121 filed in the name of David Meiri et al. dated Oct. 25, 2017 and entitled "Opportunistic Compression of Replicated Data in a Content Addressable Storage System."

U.S. Appl. No. 15/793,147 filed in the name of Ernesto Blanco et al. dated Oct. 25, 2017 and entitled "Compression Signaling for Replication Process in a Content Addressable Storage System."

U.S. Appl. No. 15/872,553 filed in the name of Svetlana Kronrod et al. dated Jan. 16, 2018 and entitled "Storage System with Consistent Termination of Data Replication Across Multiple Distributed Processing Modules."

U.S. Appl. No. 15/824,536 filed in the name of Christopher Sayles et al. dated Nov. 28, 2017 and entitled "Storage System with Asynchronous Messaging Between Processing Modules for Data Replication."

U.S. Appl. No. 15/819,666 filed in the name of Xiangping Chen et al. dated Nov. 21, 2017 and entitled "Storage System Configured for Controlled Transition Between Asynchronous and Synchronous Replication Modes."

U.S. Appl. No. 15/876,433 filed in the name of Xiangping Chen et al. dated Jan. 22, 2016 and entitled "Storage System with Consistent Initiation of Data Replication Across Multiple Distributed Processing Modules."

Dell EMC, "PowerMax OS," Dell EMC PowerMax Family Product Guide, May 2019, 192 pages.

Dell EMC, "Dell EMC VxRack FLEX," Dell EMC Product Overview, 2018, 5 pages.

U.S. Appl. No. 16/343,942 filed in the name of Yonatan Shtarkman et al. dated Apr. 22, 2019, and entitled "Snapshot-Enabled Storage System Implementing Algorithm for Efficient Reclamation of Snapshot Storage Space."

U.S. Appl. No. 16/343,949 filed in the name of Asaf Porath et al. dated Apr. 22, 2019, and entitled "Snapshot-Enabled Storage System Implementing Algorithm for Efficient Reading of Data from Stored Snapshots."

U.S. Appl. No. 16/396,897 filed in the name of Anton Kucherov et al. dated Apr. 29, 2019, and entitled "Storage System with Deduplication-Aware Replication Implemented Using a Standard Storage Command Protocol."

U.S. Appl. No. 16/413,050 filed in the name of Xiangping Chen et al. dated May 15, 2019, and entitled "Storage System with Coordinated Recovery across Multiple Input-Output Journals of Different Types."

U.S. Appl. No. 16/448,726 filed in the name of Xiangping Chen et al. dated Jun. 21, 2019, and entitled "Storage System Configured to Support One-To-Many Replication."

U.S. Appl. No. 16/530,121 filed in the name of Anton Kucherov et al. dated Aug. 2, 2019, and entitled "Memory-Efficient Processing of Raid Metadata Bitmaps."

U.S. Appl. No. 16/663,524 filed in the name of Xiangping Chen et al. dated Oct. 25 2019, and entitled "Storage System with Throughput-Based Timing of Synchronous Replication Recovery."

U.S. Appl. No. 16/665,651 filed in the name of Lior Kamran et al. dated Oct. 28 2019, and entitled "Recovery Flow with Reduced Address Lock Contention in a Content Addressable Storage System."

U.S. Appl. No. 16/671,824 filed in the name of Lior Kamran et al. dated Nov. 1, 2019, and entitled "Storage System Capacity Expansion Using Mixed-Capacity Storage Devices."

U.S. Appl. No. 16/693,858 filed in the name of Doron Tal dated Nov. 25, 2019, and entitled "Storage System with Prioritized Raid Rebuild."

\* cited by examiner

STORAGE SYSTEM CONFIGURED TO SUPPORT CASCADE REPLICATION

RELATED APPLICATION(S)

The present application is related to U.S. patent application Ser. No. 16/448,726, filed concurrently herewith and entitled "Storage System Configured to Support One-to-Many Replication," which is incorporated by reference herein in its entirety.

FIELD

The field relates generally to information processing systems, and more particularly to storage in information processing systems.

BACKGROUND

Many information processing systems are configured to replicate data from one storage system to another storage system, possibly at different physical sites. In some cases, such arrangements are utilized to support disaster recovery functionality within the information processing system. For example, an enterprise may replicate data from a production data center to a disaster recovery data center. In the event of a disaster at the production site, applications can be started at the disaster recovery site using the data that has been replicated to that site so that the enterprise can continue its business.

Data replication in these and other contexts can be implemented using asynchronous replication at certain times and synchronous replication at other times. For example, asynchronous replication may be configured to periodically transfer data in multiple cycles from a source site to a target site, while synchronous replication may be configured to mirror host writes from the source site to the target site as the writes are made at the source site. Storage systems participating in a replication process can therefore each be configured to support both asynchronous and synchronous replication modes.

Conventional approaches to data replication can be problematic under certain conditions. For example, it can be difficult to perform synchronous or asynchronous replication involving more than two storage systems, due at least in part to issues associated with maintaining consistency between replicated data on the multiple systems.

SUMMARY

Illustrative embodiments provide improved techniques for cascade replication involving two or more storage systems. For example, such embodiments can perform cascade replication across any desired number of storage systems in a highly efficient manner while also ensuring consistency between replicated data on the multiple systems.

In one embodiment, an apparatus is configured to initiate a first replication session to replicate data of a first consistency group in a first storage system to a second consistency group in a second storage system, to create an additional consistency group linked to the second consistency group in the second storage system, and to initiate a second replication session to replicate data of the additional consistency group to another consistency group in a third storage system.

The additional consistency group linked to the second consistency group in some embodiments is periodically updated against the second consistency group, illustratively by performing a snap-and-reassign operation for the additional consistency group using the second consistency group, or otherwise refreshing the additional consistency group using the second consistency group.

In some embodiments, the second consistency group is updated based at least in part on an active snapshot set of the first replication session. The additional consistency group is then updated based at least in part on the second consistency group.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
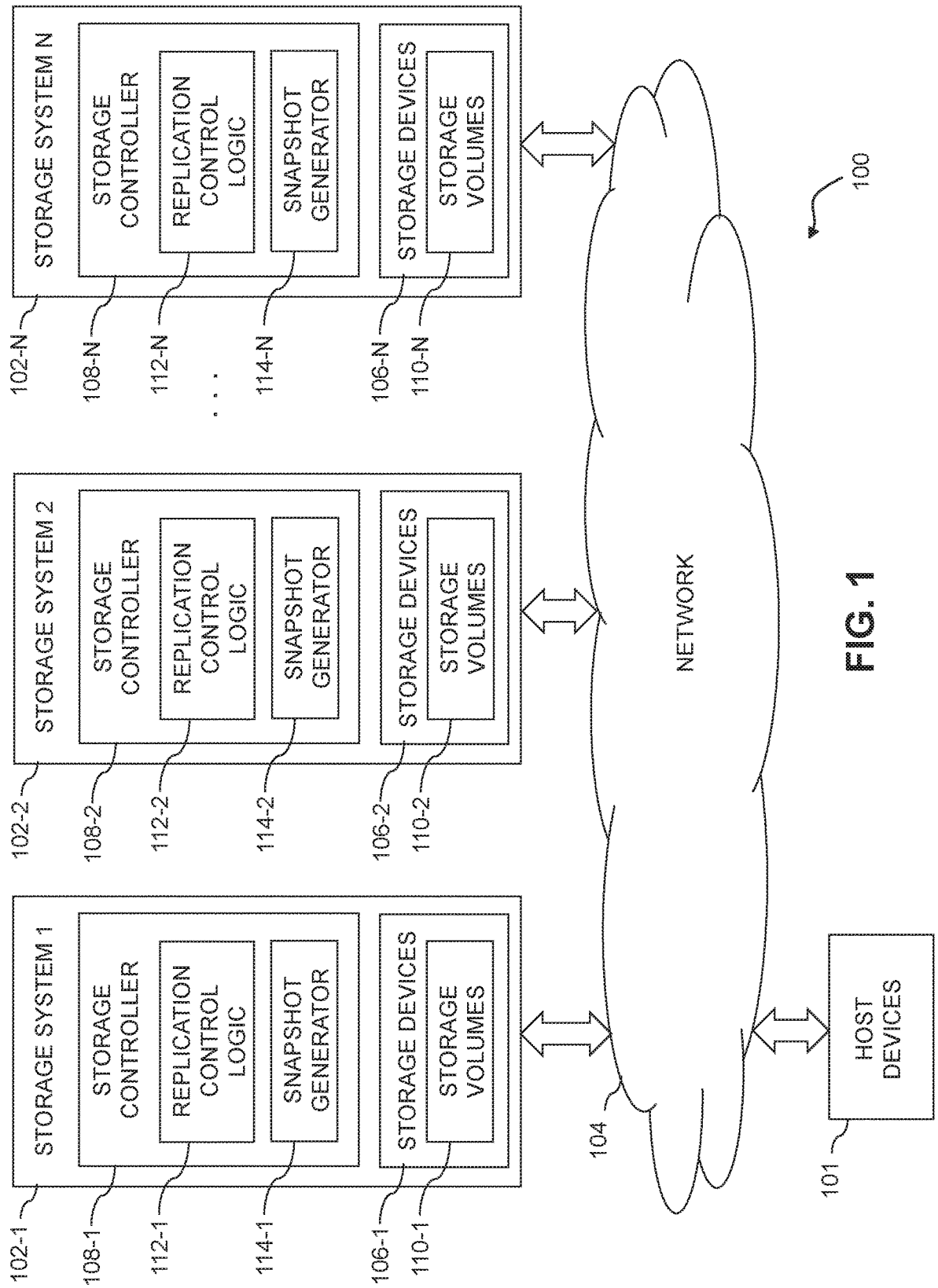
FIG. 1 is a block diagram of an information processing system comprising multiple storage systems configured with functionality for cascade replication in an illustrative embodiment.

FIG. 1 shows an information processing system 100 configured in accordance with an illustrative embodiment. The information processing system 100 comprises a plurality of host devices 101 and multiple storage systems 102-1, 102-2, . . . 102-N, all of which are configured to communicate with one another over a network 104. The storage systems 102 are more particularly configured in this embodiment to participate in a cascade replication process. For example, in some embodiments, one or more storage volumes are synchronously or asynchronously replicated from a first storage system 102-1 to a second one of the storage systems 102-2, and asynchronously replicated from the second storage system 102-2 to a third storage system 102-3, possibly with involvement of at least one of the host devices 101. One or more additional cascade stages, initially from the third storage system 102-3 to another one of the storage systems 102, and possibly from that other storage system to one or more additional ones of the storage systems 102, may also be part of the cascade replication process.

The one or more storage volumes that are subject to cascade replication from the first storage system 102-1 through two or more other ones of the storage systems 102 are illustratively part of a designated consistency group of the first storage system 102-1. That consistency group is associated with corresponding consistency groups in other ones of the storage systems 102, as will be described in more detail below.

Each of the storage systems 102 is illustratively associated with a corresponding set of one or more of the host devices 101. The host devices 101 illustratively comprise servers or other types of computers of an enterprise computer system, cloud-based computer system or other arrangement of multiple compute nodes associated with respective users.

The host devices 101 in some embodiments illustratively provide compute services such as execution of one or more applications on behalf of each of one or more users associated with respective ones of the host devices. Such applications illustratively generate input-output (IO) operations that are processed by a corresponding one of the storage systems 102. The term "input-output" as used herein refers to at least one of input and output. For example, IO operations may comprise write requests and/or read requests directed to stored data of a given one of the storage systems 102.

The storage systems 102 illustratively comprise respective processing devices of one or more processing platforms. For example, the storage systems 102 can each comprise one or more processing devices each having a processor and a memory, possibly implementing virtual machines and/or containers, although numerous other configurations are possible.

The storage systems 102 can additionally or alternatively be part of cloud infrastructure such as an Amazon Web Services (AWS) system. Other examples of cloud-based systems that can be used to provide at least portions of the storage systems 102 include Google Cloud Platform (GCP) and Microsoft Azure.

The storage systems 102 may be implemented on a common processing platform, or on separate processing platforms.

The host devices 101 are illustratively configured to write data to and read data from the storage systems 102 in accordance with applications executing on those host devices for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage systems 102-1, 102-2, . . . 102-N comprise respective sets of storage devices 106-1, 106-2, . . . 106-N and respective associated storage controllers 108-1, 108-2, . . . 108-N. The sets of storage devices 106-1, 106-2, . . . 106-N store respective sets of storage volumes 110-1, 110-2, . . . 110-N. The storage volumes 110 illustratively comprise respective logical units (LUNs) or other types of logical storage volumes.

The storage devices 106 of the storage systems 102 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices may also be used. For example, hard disk drives (HDDs) can be used in combination with or in place of SSDs or other types of NVM devices.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives or other types of SSDs while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

In some embodiments, at least one of the storage systems 102 illustratively comprises a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement storage systems 102 in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems 102 in illustrative embodiments include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

In some embodiments, communications between the host devices 101 and the storage systems 102 comprise Small Computer System Interface (SCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

The storage controllers 108-1, 108-2, . . . 108-N of storage systems 102 in the FIG. 1 embodiment include respective instances of replication control logic 112-1, 112-2, . . . 112-N and respective snapshot generators 114-1, 114-2, . . . 114-N.

Although not explicitly shown in the figure, additional components can be included in the storage controllers 108, such as signature generators utilized in generating content-based signatures of data pages.

The instances of replication control logic 112-1, 112-2, . . . 112-N are collectively referred to herein as replication control logic 112. Such replication control logic instances are also referred to herein as individually or collectively comprising at least a portion of a "replication engine" of the system 100.

The replication control logic 112 of the storage systems 102 controls performance of the cascade replication process carried out between those storage systems, which as noted above in some embodiments further involves at least one of the host devices 101. The data replicated from the first storage system 102-1 to the second storage system 102-2, and from the second storage system 102-2 to the third storage system 102-3, can include all of the data stored in the first storage system 102-1, or only certain designated subsets of the data stored in the first storage system 102-1, such as particular designated sets of LUNs or other logical storage volumes. Different replication processes of different types can be implemented for different parts of the stored data. Also, the storage systems 102 can be configured to operate in different replication modes of different types at different times. For example, a given pair of the storage systems 102 can transition from an asynchronous replication mode to a synchronous replication mode and vice versa.

A given storage volume designated for cascade replication from the first storage system 102-1 to two or more other ones of the storage systems 102 illustratively comprises a set of one or more LUNs or other instances of the storage volumes 110-1 of the first storage system 102-1. Each such LUN or other storage volume illustratively comprises at least a portion of a physical storage space of one or more of the storage devices 106-1. The corresponding replicated LUN or other storage volume of the storage volumes 110 of the other storage systems 102 illustratively comprises at least a portion of a physical storage space of one or more of their respective sets of storage devices 106.

Figure 2:
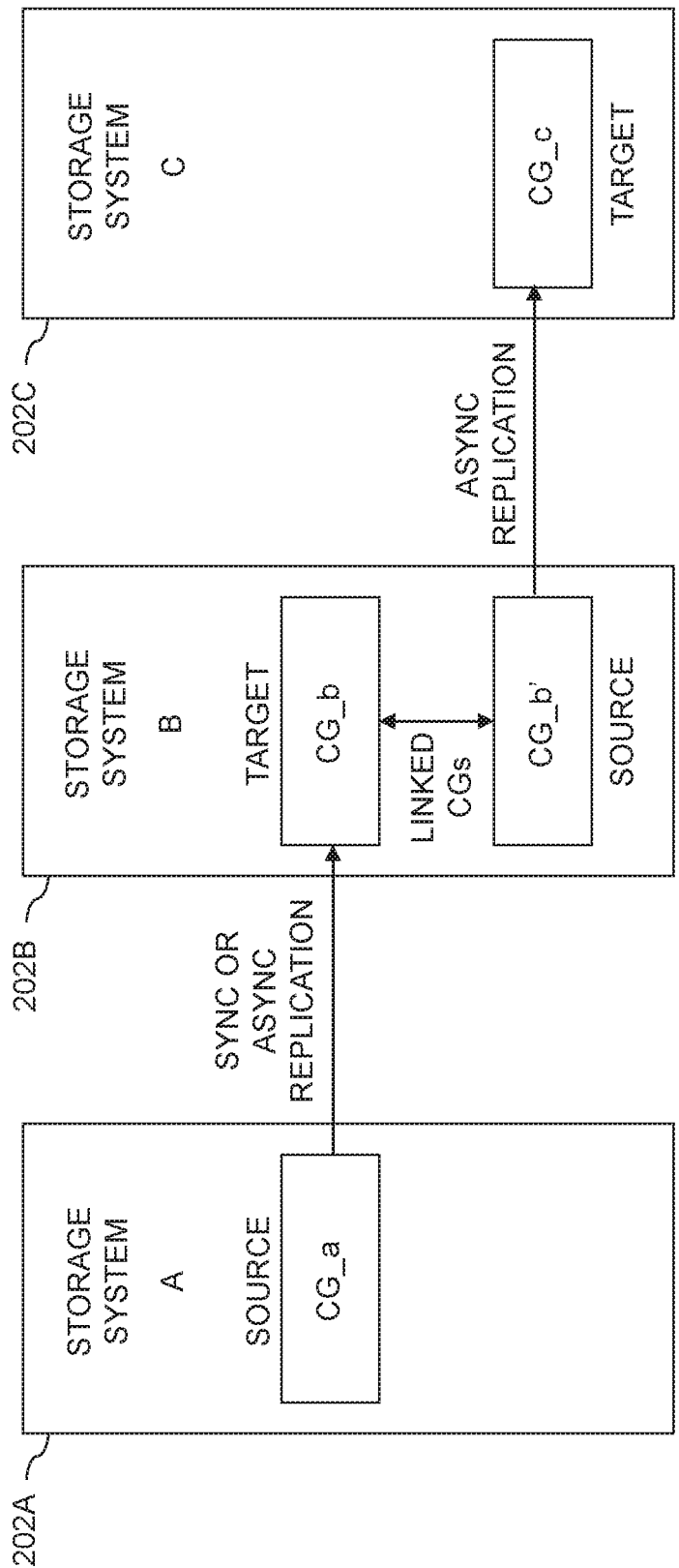
FIG. 2 shows an example of one possible cascade replication scenario in an illustrative embodiment.
Figure 3:
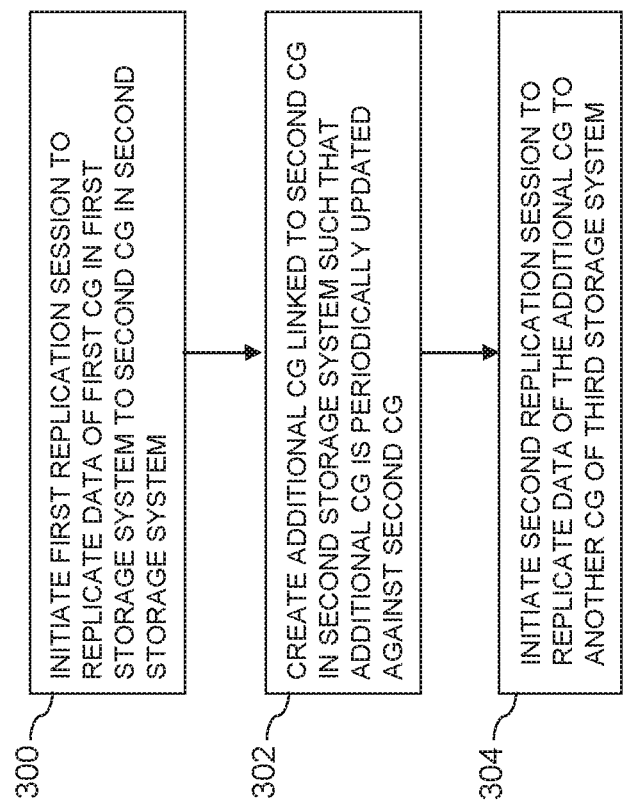
FIG. 3 is a flow diagram of a process for cascade replication in an illustrative embodiment.

The replication control logic 112 of the storage systems 102 in some embodiments is configured to control the performance of corresponding portions of a cascade replication process of the type illustrated in the diagrams of FIGS. 2 and 3. At least one of the host devices 101 in some embodiments can also include one or more instances of replication control logic and possibly also one or more snapshot generators, as well as additional or alternative components such as a signature generator.

The storage controllers 108 of the storage systems 102 should also be understood to include additional modules and other components typically found in conventional implementations of storage controllers and storage systems, although such additional modules and other components are omitted from the figure for clarity and simplicity of illustration.

As noted above, a cascade replication process as disclosed herein can involve both asynchronous and synchronous replication processes, and possibly uses different types of replication between different ones of the storage systems 102 in different stages of the cascade replication process.

The asynchronous replication process more particularly comprises a cycle-based asynchronous replication process in which a consistency group comprising one or more storage volumes is replicated from one of the storage systems 102 to another one of the storage systems 102 over a plurality of asynchronous replication cycles. Such an arrangement is illustratively configured to guarantee data consistency between the storage volumes of the consistency group on the source and their corresponding replicated versions on the target. The asynchronous replication is performed periodically over the multiple cycles. The asynchronous replication is illustratively implemented at least in part by or otherwise under the control of the source and target instances of replication control logic 112.

The asynchronous replication can be part of a replication process that includes both asynchronous and synchronous replication modes. For example, such a replication process can include a cycle-based asynchronous replication mode of the type described above as well as a synchronous replication mode in which host write operations directed to the source storage object are mirrored to the target storage object. A wide variety of other types of replication modes or processes can be used in other embodiments.

A given "replication process" as that term is broadly used herein may therefore include both asynchronous and synchronous replication modes as well as support for concurrent operation of such modes and separate operation of the individual modes. The term "mode" as used herein in conjunction with asynchronous or synchronous replication may therefore itself comprise a corresponding asynchronous or synchronous replication process. Multiple such processes are illustratively used between different pairs of the storage systems 102 as part of a given cascade replication process.

In some embodiments, concurrent replication in the system 100 is carried out in the following manner. A first replication session is initiated to replicate data of a first consistency group in the first storage system 102-1 to a second consistency group in the second storage system 102-2. The first storage system 102-1 is referred to as "source storage system" or as simply a "source" relative to the second storage system 102-2 which is referred to as a "target storage system" or simply a "target." An additional consistency group is created and linked to the second consistency group in the second storage system 102-2. A second replication session is then initiated to replicate data of the additional consistency group to another consistency group in the third storage system 102-3.

This process can be repeated for one or more additional cascade replication stages involving one or more additional replication sessions and one or more additional linked consistency groups. For example, a further consistency group can be created and linked to the other consistency group in the third storage system, and a third replication session initiated to replicate data of the further consistency group to another consistency group in a fourth storage system. Other additional cascade replication stages can be implemented for other storage systems in a similar manner.

Terms such as "linked" or "linking" as used herein in the context of establishing a relationship between multiple consistency groups are intended to be broadly construed. For example, the "linking" of a given consistency group to another consistency group as that term is broadly used herein is intended to encompass various arrangements in which the given consistency group is configured for periodic or otherwise automated updating against the other consistency group. The updated consistency group in some embodiments herein can itself be considered a separate consistency group, and the term "consistency group" is therefore also intended to be broadly construed.

The replication sessions are illustratively initiated by the replication control logic instances 112 of the respective storage controllers 108 of the storage systems 102 that are part of the cascade replication process. Other arrangements are possible. For example, replication sessions can be initiated and other aspects of the cascade replication process can be controlled at least in part by one or more of the host devices 101.

As mentioned previously, the term "storage volume" as used herein is intended to be broadly construed, and should not be viewed as being limited to any particular format or configuration. The term "consistency group" as used herein is also intended to be broadly construed, and may comprise one or more storage volumes.

The first replication session illustratively comprises one of a synchronous replication session and an asynchronous replication session, and the second replication session illustratively comprises an asynchronous replication session. Other types of session arrangements can be used in other embodiments.

The additional consistency group linked to the second consistency group is periodically updated against the second consistency group.

In some embodiments, the second consistency group is updated based at least in part on an active snapshot set of the first replication session, the additional consistency group is updated based at least in part on the second consistency group, and data of the additional consistency group is replicated to the other consistency group in the third storage system.

By way of example, updating the additional consistency group based at least in part on the second consistency group illustratively comprises performing a snap-and-reassign operation for the additional consistency group using the second consistency group, or otherwise refreshing the additional consistency group using the second consistency group.

Referring now to FIG. 2, an example of one possible cascade replication scenario is shown. In this illustrative embodiment, cascade replication is carried out between three storage systems 202A, 202B and 202C, which can correspond to any three of the storage systems 102 of FIG. 1, but are assumed to correspond to respective first, second and third storage systems 102-1, 102-2 and 102-3. In other embodiments, more than three of the storage systems 102 can participate in a cascade replication process.

The three storage systems of FIG. 2 are also denoted as storage systems A, B and C in this embodiment. The cascade replication scenario in this embodiment more particularly comprises synchronous or asynchronous replication from A to B, and asynchronous replication from B to C, collectively referred to as cascade replication from A→B→C. A first replication session is initiated to replicate data of a first consistency group CG_a in storage system A to a second consistency group CG_b in storage system B. Storage system A is the source and storage system B is the target in this first replication session. An additional consistency group CG_b' is created and linked to the second consistency group CG_b in storage system B. A second replication session is then initiated to replicate data of the additional consistency group CG_b' to another consistency group CG_c in storage system C. Storage system B is the source and storage system C is the target in this second replication session. The first replication session between A and B is either synchronous or asynchronous replication, but the second replication session between B and C is assumed to be asynchronous replication.

In the FIG. 2 example of cascade replication from A→B→C, the storage systems A, B and C may be located at different ones of multiple sites. For example, storage systems A and B may be part of a first data center located at a first site, and storage system C may be part of a second data center at a second site that is remote from the site of the first data center. Numerous other arrangements of one or more data centers or sites may be associated with the multiple storage systems involved in a given cascade replication process.

The cascade replication process illustrated in FIG. 2 is configured to utilize storage system B as the target of the replication from A→B, and as the source of the replication from B→C, while also replicating data from A→B→C in a consistent manner.

An example implementation of this cascade replication process more particularly includes the following steps:

1. Create the first replication session to replicate data from the first consistency group CG_a in storage system A to the second consistency group CG_b in storage system B. The first replication session can be set in a synchronous replication mode or an asynchronous replication mode.

2. Create the additional consistency group CG_b' to link against the second consistency group CG_b in storage system B. The linked consistency group CG_b' has its own set of attributes as a regular CG object, however, its data content is obtained via snap-and-reassign or refresh from CG_b.

3. Create the second replication session using CG_b' as source in storage system B to the consistency group CG_c as target in storage system C. The second replication session is set to an asynchronous replication mode.

4. Set a cascade refresh schedule based on a recovery point objective (RPO) requirement of the second replication session. First refresh CG_b against an active snapshot set ("snap set") of the first replication session, and then refresh CG_b' against CG_b.

5. Repeat steps similar to steps 2 to 4 above for any additional target(s) to be included in the cascade replication process.

Note that the linked CG_b' in this embodiment is updated via snap-and-reassign or refresh with the first replication target CG_b, and CG_b is updated via refresh with the active snap set of the first replication session, and thus the content of CG_b' and CG_b are synchronized via the cascade replication process.

The particular process steps above, like those of other processes disclosed herein, can be varied in other embodiments. For example, additional or alternative process steps can be included, and the ordering of the process steps can be varied. Also, the process steps need not be performed serially, but instead at least some of the steps can be performed concurrently with one or more other ones of the steps.

In some embodiments, asynchronous replication, such as the asynchronous replication from B→C in the FIG. 2 embodiment, is performed using efficient differential scanning of snapshot pairs as described in U.S. patent application Ser. No. 16/357,957, filed Mar. 19, 2019 and entitled "Storage System with Differential Scanning of Non-Ancestor Snapshot Pairs in Asynchronous Replication," now U.S. Pat. No. 10,891,195, which is incorporated by reference herein in its entirety. For example, using such techniques, a differential scanning routine can efficiently calculate the content update for each linked CG from refresh, so as to ensure successful asynchronous data replication from source to target.

Accordingly, some embodiments utilize efficient differential scanning in replicating data of a source storage system to a target storage system, such as from the additional consistency group CG_a' in storage system A to the other consistency group CG_c in storage system C in the context of the FIG. 2 embodiment. In conjunction with the efficient differential scanning, the source storage system generates a current snapshot set for a consistency group comprising a plurality of storage volumes subject to replication from the source storage system to the target storage system, and schedules a differential scan of the current snapshot set relative to a previous snapshot set generated for the consistency group. The term "scheduling" as used herein is intended to be broadly construed, so as to encompass, for example, initiating, triggering or otherwise controlling performance of a differential scan in conjunction with a given replication cycle of the asynchronous replication of the consistency group. Scheduling the differential scan in some embodiments therefore comprises scheduling the differential scan for the given replication cycle of the asynchronous replication.

It is assumed for the present embodiment that the given replication cycle is a non-initial replication cycle of an ongoing asynchronous replication process, such that there is a previous snapshot set already available from a previous cycle. In an initial replication cycle, the entire content of the current snapshot set is illustratively transferred from the source to the target, and differential scanning is not utilized. The current snapshot set for the initial replication cycle becomes the previous snapshot set for the next replication cycle.

The current snapshot set and other snapshot sets referred to in the context of some embodiments herein are illustratively generated for a consistency group that comprises multiple storage volumes. A snapshot tree of the consistency group in such embodiments illustratively comprises multiple individual snapshot trees for respective ones of the storage volumes, each generally having the same topology of nodes. Accordingly, generation of a snapshot set for a consistency group illustratively comprises generating a plurality of snapshots for respective ones of the multiple storage volumes. Such snapshot sets and associated versions of the consistency group vary over time and are represented by nodes of the snapshot tree of the consistency group. Again, the snapshot tree for the consistency group may be viewed as illustratively comprising multiple superimposed snapshot trees for the respective storage volumes of the consistency group with each such storage volume snapshot tree having substantially the same topology as the consistency group snapshot tree.

A given one of the snapshot trees corresponding to a particular one of the storage volumes more particularly comprises a root node, at least one branch node, and a plurality of leaf nodes, with a given one of the branch nodes representing a particular version of the storage volume from which a corresponding snapshot is taken. A first one of the leaf nodes which is a child of the given branch node represents a subsequent version of the storage volume, and a second one of the leaf nodes which is a child of the given branch node comprises the corresponding snapshot providing a point-in-time (PIT) copy of the particular version of the storage volume.

Illustrative examples of consistency group snapshot trees of the type described above are shown in FIGS. 4A, 4B, 4C and 4D, and will be described in greater detail below in conjunction with the flow diagram of FIG. 3.

In some embodiments, the snapshot trees comprise or are otherwise associated with additional information also arranged in the form of a tree structure. For example, a given one of the snapshot trees may be associated with one or more additional trees including at least one of a "dirty" tree that characterizes updates to logical addresses of the corresponding storage volume, and a hash tree comprising content-based signatures of respective ones of the logical addresses of the corresponding storage volume. All nodes of a given snapshot tree in some embodiments, including both branch nodes and leaf nodes, may each be associated with corresponding metadata of both a dirty tree and a hash tree.

An instance of the differential scan performed for the given snapshot tree in embodiments of this type can further comprise aggregating information of at least one of the dirty tree and the hash tree between start and stop nodes of the given snapshot tree. The start and stop nodes are examples of what are more generally referred to herein as first and second nodes corresponding to respective current and previous snapshot sets. Start and stop nodes can comprise branch nodes or leaf nodes associated with those branch nodes. Also, a given one of the first and second nodes can comprise a leaf node rather than a branch node. Terms such as "start node," "stop node," "first node" and "second node" are therefore intended to be broadly construed, and should not be viewed as being restricted to either branch nodes or leaf nodes.

A wide variety of other types of snapshot trees and possibly one or more associated additional trees can be used in other embodiments. Also, the term "tree" as used herein is intended to be broadly construed so as to comprise any type of data structure characterizing a plurality of nodes and a plurality of edges interconnecting respective pairs of the nodes.

The content-based signatures of the above-noted hash tree associated with a given storage volume in some embodiments comprise hash digests of their respective pages, each generated by application of a hash function such as the well-known Secure Hashing Algorithm 1 (SHA1) to the content of its corresponding page. Other types of secure hashing algorithms, such as SHA2 or SHA256, or more generally other hash functions, can be used in generating content-based signatures herein.

A given hash digest in illustrative embodiments is unique to the particular content of the page from which it is generated, such that two pages with exactly the same content will have the same hash digest, while two pages with different content will have different hash digests. It is also possible that other types of content-based signatures may be used, such as hash handles of the type described elsewhere herein. A hash handle generally provides a shortened representation of its corresponding hash digest. More particularly, the hash handles are shorter in length than respective hash digests that are generated by applying a secure hashing algorithm to respective ones of the data pages. Hash handles are considered examples of "content-based signatures" as that term is broadly used herein.

In embodiments in which the storage systems 102 comprise content addressable storage systems, address metadata is illustratively utilized to provide content addressable storage functionality within those systems. The address metadata in some embodiments comprises at least a portion of one or more logical layer mapping tables that map logical addresses of respective ones of the data pages of the storage volume to corresponding content-based signatures of the respective data pages. Examples of logical layer mapping tables and other metadata structures maintained by at least the storage controllers 108 of storage systems 102 in some embodiments will be described elsewhere herein.

The manner in which a source storage system processes the snapshot trees of respective storage volumes in conjunction with asynchronous replication of the consistency group will now be described in further detail.

For each of one or more snapshot trees maintained for the consistency group, the source storage system determines if a first node corresponding to the previous snapshot set is an ancestor of a second node corresponding to the current snapshot set. The source storage system then alters a manner in which an instance of the differential scan is performed for the snapshot tree responsive to a result of the determination. The first and second nodes may comprise, for example, respective branch nodes of the snapshot tree. Alternatively, at least one of the first and second nodes may comprise a leaf node.

In some embodiments, for example, the current snapshot set is derived from a restored version of at least a portion of the consistency group, such that the first node corresponding to the previous snapshot set is not an ancestor of the second node corresponding to the current snapshot set. Such situations can arise, for example, when one or more storage volumes have been restored to previous versions during an ongoing replication process. Illustrative embodiments advantageously allow efficient differential scanning to be performed in these and other situations in which the first node is not an ancestor of the second node.

Determining if the first node corresponding to the previous snapshot set is an ancestor of the second node corresponding to the current snapshot set in some embodiments more particularly comprises inspecting a path from the second node towards a root node of the snapshot tree. Responsive to the first node being part of the path, a determination is made that the first node is an ancestor of the second node. Responsive to the first node not being part of the path, a determination is made that the first node is not an ancestor of the second node. The first node is illustratively considered "part of the path" if it is encountered in traversing the path, and is otherwise not considered "part of the path."

In some embodiments, altering a manner in which an instance of the differential scan is performed for the snapshot tree responsive to a result of the determination includes performing a first type of differential scan comprising aggregating node metadata of a path from the second node to the first node responsive to the first node being an ancestor of the second node, and performing a second type of differential scan different than the first type of differential scan responsive to the first node not being an ancestor of the second node. For example, the second type of differential scan illustratively comprises identifying a first path from the first node to a root node, identifying a second path from the second node to the root node, determining a lowest common ancestor between the first and second paths, combining the first and second paths at the lowest common ancestor, and aggregating node metadata of the combined first and second paths.

In the above-described instance of the differential scan, the aggregated metadata is utilized to determine all changed data pages of each storage volume of the consistency group between the current and previous snapshot sets. The resulting differential data is provided from the source storage system to the target storage system.

The instance of the differential scan is therefore illustratively performed by the source storage system in the given replication cycle of the asynchronous replication of the consistency group. In addition, results of performing the instance of the differential scan are transmitted from the source storage system to the target storage system in the given replication cycle.

A more particular example of the differential scanning functionality described above will now be presented. In this example, the replication control logic instances 112 are assumed to cooperate to facilitate differential scanning of non-ancestor snapshot pairs in conjunction with ongoing asynchronous replication of a consistency group from the source to the target. Like other embodiments herein, the process utilized in the present example advantageously provides efficient differential scanning even in those situations in which one or more storage volumes have been subject to restoration from a previous snapshot as part of an ongoing asynchronous replication process.

Figure 4A:
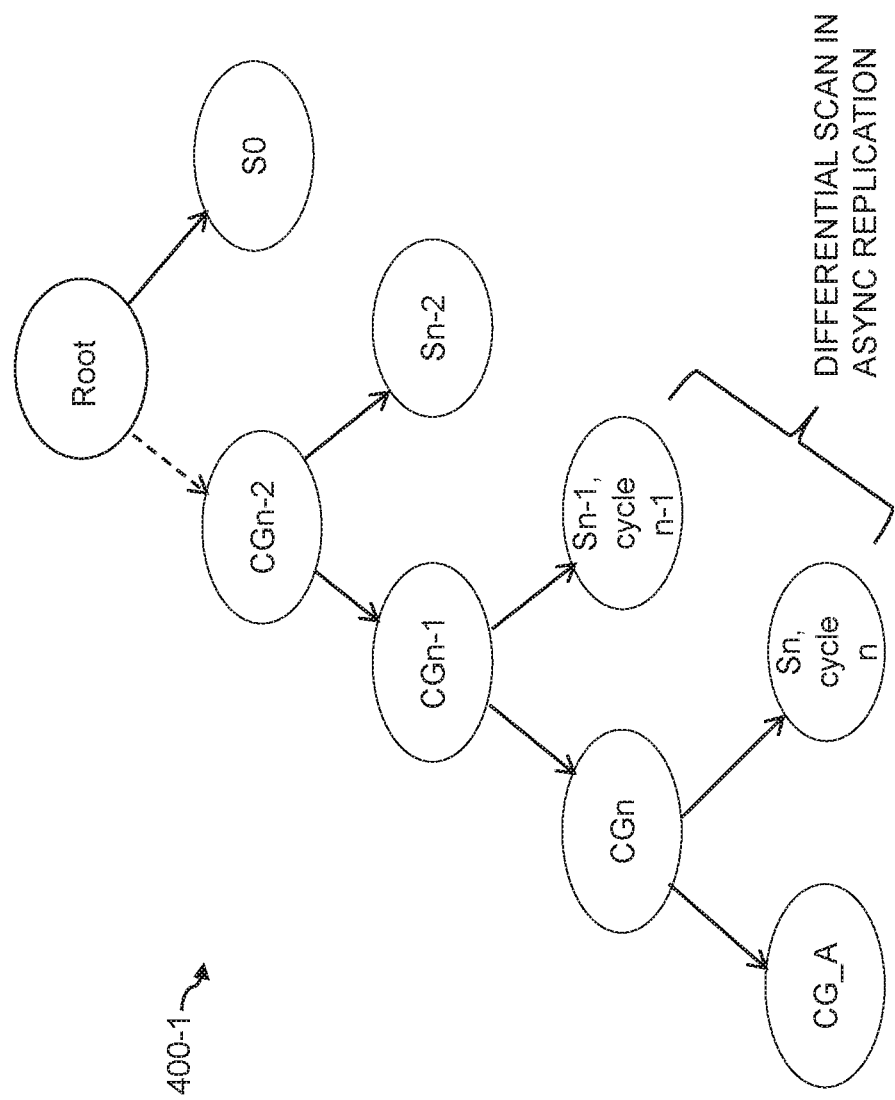
FIGS. 4A, 4B, 4C and 4D show examples of snapshot trees utilized in conjunction with cascade replication in an illustrative embodiment.

In the present example, it is assumed that the source and target storage systems are configured via their respective instances of replication control logic 112 to perform efficient differential scanning in situations in which the first node is an ancestor of the second node, including the situation illustrated in FIG. 4A. The efficient differential scanning generally involves aggregating node metadata between the first and second nodes, using the above-described dirty trees and hash trees which fully characterize any data changes between the corresponding snapshots. Such node metadata provides all the information needed to perform the differential scanning in a particularly efficient manner, thereby enhancing the performance of the overall asynchronous replication process.

These illustrative embodiments allow such efficient differential scanning to also be performed even in those situations in which the first node is not an ancestor of the second node. This illustratively includes those situations in which one or more storage volumes of the consistency group are "refreshed" or otherwise restored to previous versions during the ongoing asynchronous replication process, also referred to herein as "live" restoration of the one or more storage volumes.

Accordingly, illustrative embodiments can provide efficient differential scanning between any two snapshots in a snapshot tree, regardless of whether or not the two snapshots are an ancestor snapshot pair or a non-ancestor snapshot pair.

The differential scanning process in the present example includes the following steps:

1. Determine whether or not a first node corresponding to a previous snapshot of a previous snapshot set generated for a consistency group is an ancestor of a second node corresponding to a current snapshot of a current snapshot set generated for the consistency group. This illustratively involves following a node chain from the second node towards the root node. If the root node is reached from the second node without encountering the first node on the node chain, the first node is not an ancestor of the second node.

2. If the first node is an ancestor of the second node, aggregate the node metadata between the first and second nodes including information provided by the corresponding dirty tree and hash tree. For example, such aggregation can involve first aggregating the dirty tree metadata of a node chain from the first node to the second node to identify any changed data pages of the one or more storage volumes and then "walking up" the node chain to determine the corresponding hash handles of the changed pages from the hash tree metadata. Other aggregation techniques can be used in other embodiments.

3. If the first node is not an ancestor of the second node, determine the lowest common ancestor for node chains between the first node and the root node and between the second node and the root node. Such node chains are also referred to herein as respective "paths" from the first and second nodes to the root node. The lowest common ancestor is a node that is on both of the node chains. A new node chain is then formed by combining the two node chains at the lowest common ancestor. The node metadata of the combined first and second node chains is then aggregated, illustratively by first aggregating the dirty tree metadata of the new node chain from the first node to the second node to identify any changed data pages of the one or more storage volumes and then "walking up" the snapshot tree from the second node to the root node over at least a portion of the new node chain in order to determine the corresponding hash handles from the hash tree metadata of the changed pages. As a more particular example, the dirty tree metadata is illustratively used to create a differential bitmap that indicates which of the pages of the storage volume have changed since the previous snapshot was taken, and the hash handles of those changed pages are then determined from the hash tree metadata. Again, other aggregation techniques can be used in other embodiments.

The above-described illustrative embodiments include examples of differential scanning of non-ancestor snapshot pairs in ongoing asynchronous replication. Such arrangements illustratively allow differential scanning to proceed in an efficient manner even in those situations in which one or more storage volumes have been restored using corresponding previous snapshots during an ongoing replication process. For example, such arrangements avoid the need to terminate and subsequently restart the ongoing replication process in order to restore one or more storage volumes of a consistency group using previous versions.

In the foregoing examples, the various process steps are assumed to be performed primarily by the participating storage systems 102 via a replication engine comprising their respective replication control logic instances 112 of their respective storage controllers 108. Other arrangements of process steps can be used in other embodiments. Also, the particular ordering of the steps shown above can be varied.

The storage systems 102 in the FIG. 1 embodiment are assumed to be implemented using at least one processing platform each comprising one or more processing devices each having a processor coupled to a memory. Such processing devices can illustratively include particular arrangements of compute, storage and network resources.

The storage systems 102 may be implemented on respective distinct processing platforms, although numerous other arrangements are possible. At least portions of their associated host devices may be implemented on the same processing platforms as the storage systems 102 or on separate processing platforms.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the storage systems 102 to reside in different data centers. Numerous other distributed implementations of the storage systems 102 and their respective associated sets of host devices are possible.

Additional examples of processing platforms utilized to implement storage systems and possibly their associated host devices in illustrative embodiments will be described in more detail below in conjunction with FIGS. 6 and 7.

It is to be appreciated that these and other features of illustrative embodiments are presented by way of example only, and should not be construed as limiting in any way.

Accordingly, different numbers, types and arrangements of system components such as host devices 101, storage systems 102, network 104, storage devices 106, storage controllers 108 and storage volumes 110 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, in other embodiments, at least portions of the above-described cascade replication functionality can be implemented in one or more host devices, or partially in a host device and partially in a storage system. Illustrative embodiments are not limited to arrangements in which all such functionality is implemented in storage systems or a host device, and therefore encompass various hybrid arrangements in which the functionality is distributed over one or more storage systems and one or more associated host devices, each comprising one or more processing devices. References herein to "one or more processing devices" configured to implement particular operations or other functionality should be understood to encompass a wide variety of different arrangements involving one or more processing devices of at least one storage system and/or at least one host device.

As another example, at least one storage system participating in a cascade replication process operates as a target relative to one storage system and as a source relative to another storage system. Terms such as "source" and "target" as used herein are therefore intended to be broadly construed.

The operation of the information processing system 100 will now be described in further detail with reference to the flow diagram of the illustrative embodiment of FIG. 3, which implements a cascade replication process involving at least three storage systems. The steps of the process illustratively involve interactions between the storage systems, which are referred to as first, second and third storage systems in the figure, illustratively utilizing replication control logic instances and snapshot generators of storage controllers of the respective storage systems. It is possible in other embodiments that at least one of the storage systems does not include replication control logic and a snapshot generator, and in such embodiments these components are instead implemented in one or more host devices.

The cascade replication process as illustrated in FIG. 3 includes steps 300 through 304, and is suitable for use in system 100 but is more generally applicable to other types of information processing systems in which data is replicated from a first storage system across multiple other storage systems.

In step 300, a first replication session is initiated to replicate data of a first consistency group (CG) in the first storage system to a second CG in the second storage system.

In step 302, an additional CG is created that is linked to the second CG in the second storage system such that the additional CG is periodically updated against the second CG.

In step 304, a second replication session is initiated to replicate data of the additional CG to another CG of the third storage system.

Additional stages of a cascade replication process can be included by repeating additional instances of steps 302 and 304 for each such additional stage.

As previously described, a given one of the replication sessions in some embodiments, such as the replication from B→C in the FIG. 2 embodiment, utilizes an asynchronous replication mode. As part of the asynchronous replication, a source storage system generates a current snapshot set ("snap set") for a consistency group comprising multiple storage volumes. The consistency group is then subject to cycle-based asynchronous replication from the source to the target. The term "snapshot set" as used herein is intended to be broadly construed, and in some embodiments a given snapshot set can include only a single snapshot. Also, a consistency group in some embodiments can comprise only a single storage volume or other type of storage object. The source schedules a differential scan of the current snap set relative to a previous snap set generated for the consistency group. The differential scan is illustratively utilized to generate differential data, also referred to as representing a "delta" between the two snap sets, for communication from source to target in a given replication cycle of the cycle-based asynchronous replication process.

Efficient differential scanning techniques of the type described elsewhere herein may be used in performing asynchronous replication. Such techniques illustratively involve determining whether or not a first snapshot tree node corresponding to a previous snapshot of a selected storage volume is an ancestor of a second snapshot tree node corresponding to a current snapshot of the selected storage volume. The first and second nodes illustratively comprise respective branch nodes in a snapshot tree of the selected storage volume, although at least one of the first and second nodes could comprise a leaf node. If the first node is an ancestor of the second node in the snapshot tree, a first type of differential scan is performed by aggregating node metadata between the first and second nodes in the manner described elsewhere herein. Otherwise, a second type of differential scan is performed by aggregating node metadata for paths combined at a lowest common ancestor in the manner described elsewhere herein.

It is to be appreciated that terms such as "aggregating" and "aggregate" as used herein are intended to be broadly construed, and can include multiple different types of aggregation, such as aggregation of dirty tree metadata followed by aggregation of hash tree metadata, with each such aggregation type possibly proceeding in different directions through at least portions of a given node chain and in some cases involving different node chains potentially having different sets of nodes.

FIGS. 4A, 4B, 4C and 4D show examples of snapshot trees utilized in a cascade replication process such as that of FIG. 3.

Referring initially to FIG. 4A, an example snapshot tree 400-1 for a consistency group is shown. Such a snapshot tree illustratively represents a combination of multiple superimposed snapshot trees for respective ones of the storage volumes of the consistency group, with each of the storage volume snapshot trees having substantially the same format as the snapshot tree 400-1. Thus, although the snapshot tree format illustrated in the figure is for a particular consistency group, it is also representative of multiple individual snapshot trees for respective storage volumes of the consistency group.

The snapshot tree 400-1 comprises a root node and a plurality of branch nodes denoted CGn−2, CGn−1, CGn and CG_A. The root node represents a version of the consistency group from which an initial PIT copy is captured as snapshot set S0. The branch nodes CGn−2, CGn−1 and CGn represent subsequent versions of the consistency group from which respective PIT copies are captured as subsequent snapshot sets Sn−2, Sn−1 and Sn, as the storage volumes of the consistency group change over time responsive to execution of IO operations.

The snapshot sets Sn−1 and Sn are associated with respective previous and current replication cycles denoted as cycle n−1 and cycle n. The branch node CG_A illustratively represents the state of the consistency group subsequent to generation of the snapshot set Sn. For example, it may be viewed as representing a current state of the consistency group CG_a of the FIG. 2 embodiment, assuming use of asynchronous replication for the first replication session used to replicate data of CG_a to CG_b.

A given storage volume snapshot tree having a format of the type shown in FIG. 4A represents a storage volume and its snapshots over time. Each leaf node represents a particular version of the storage volume or a snapshot of the storage volume, and each branch node represents a shared ancestor between a version of the storage volume, a snapshot of the storage volume, or a child branch node. When a given snapshot of the storage volume is created, two child leaf nodes are created, one representing new updates to the storage volume after creation of the snapshot, and the other representing the snapshot. The volume node from which the snapshot was created therefore becomes a branch node in the snapshot tree. When a given snap set of the consistency group is created for its member storage volumes, two new leaf nodes are created in each of the snapshot trees of the respective storage volumes.

The given storage volume snapshot tree having a format of the type shown in FIG. 4A illustratively corresponds to a particular storage volume that has not been subject to live restoration during the replication process. The instance of the differential scan performed in this example utilizes as its start node the non-root node corresponding to snapshot set Sn−1 of the previous replication cycle and utilizes as its stop node the non-root node corresponding to snapshot set Sn of the current cycle. These start and stop nodes are associated with respective branch nodes CGn−1 and CGn. References herein to first and second nodes in illustrative embodiments refer to respective branch nodes of a snapshot tree. A given such branch node generally has at least one corresponding leaf node. It is also possible that at least one of the first and second nodes can alternatively comprise a leaf node.

The snapshot tree of FIG. 4A therefore represents an example of a snapshot tree for a replication source such as source consistency group CG_a to be replicated to target consistency group CG_b in the FIG. 2 embodiment, assuming for this particular example that asynchronous replication is used.

Figure 4B:
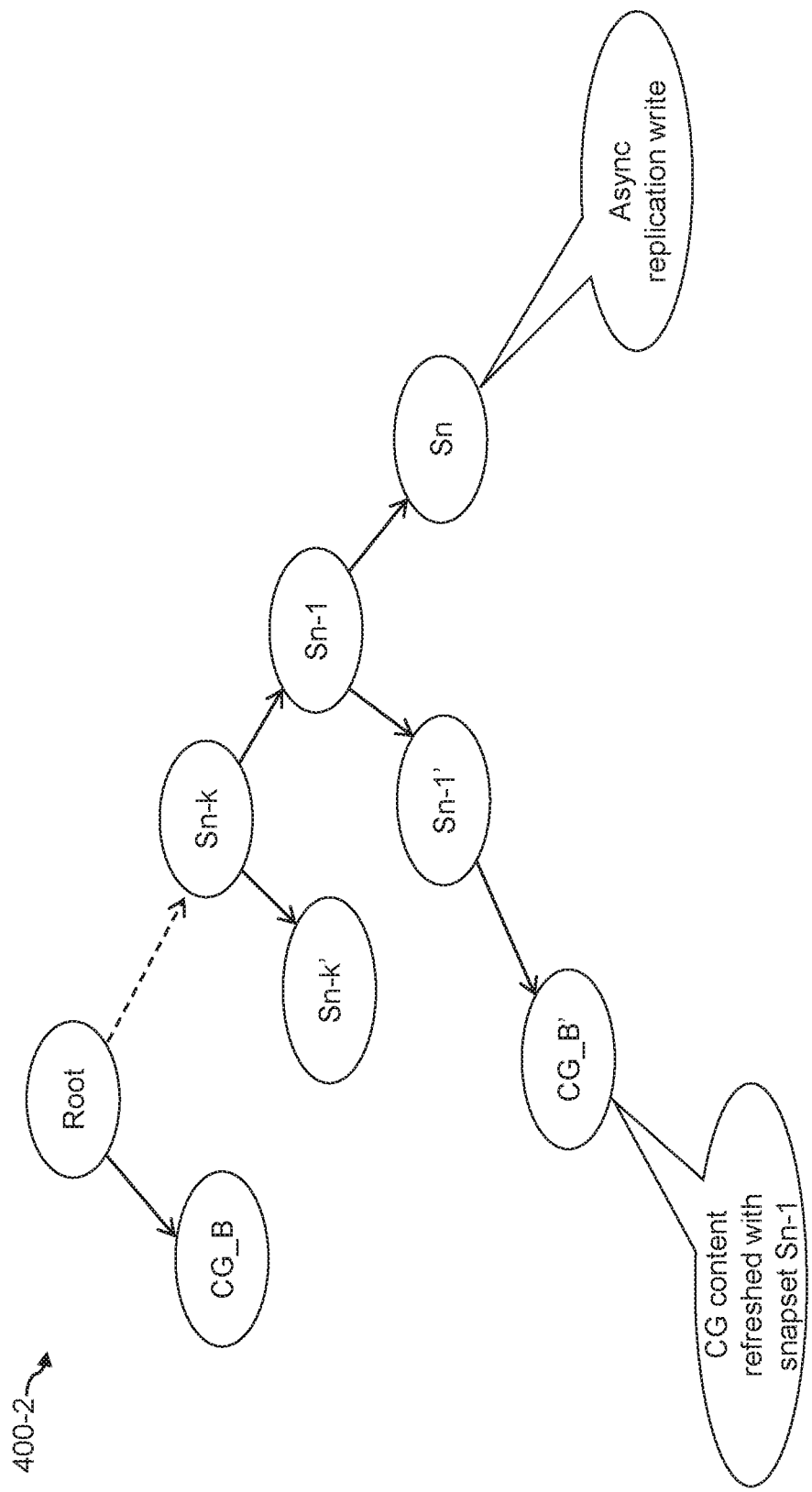

FIG. 4B shows an example of a snapshot tree 400-2 that illustrates an asynchronous replication target such as CG_b of FIG. 2 prior to cascade replication. In this example, asynchronous replication writes are made to the replication target and corresponding versions are shown as respective versions Sn−k, Sn−1 and Sn. Snapshot sets Sn−k' and Sn−1' represent snapshots taken of the respective consecutive versions Sn−k and Sn−1. A version CG_B has its content refreshed using content of version Sn−1 as captured by snapshot set Sn−1' in order to produce an updated version CG_B' as illustrated. In this example, the consistency group is illustratively refreshed to a version corresponding to snapshot set Sn−1 that captures asynchronous replication writes.

Figure 4C:
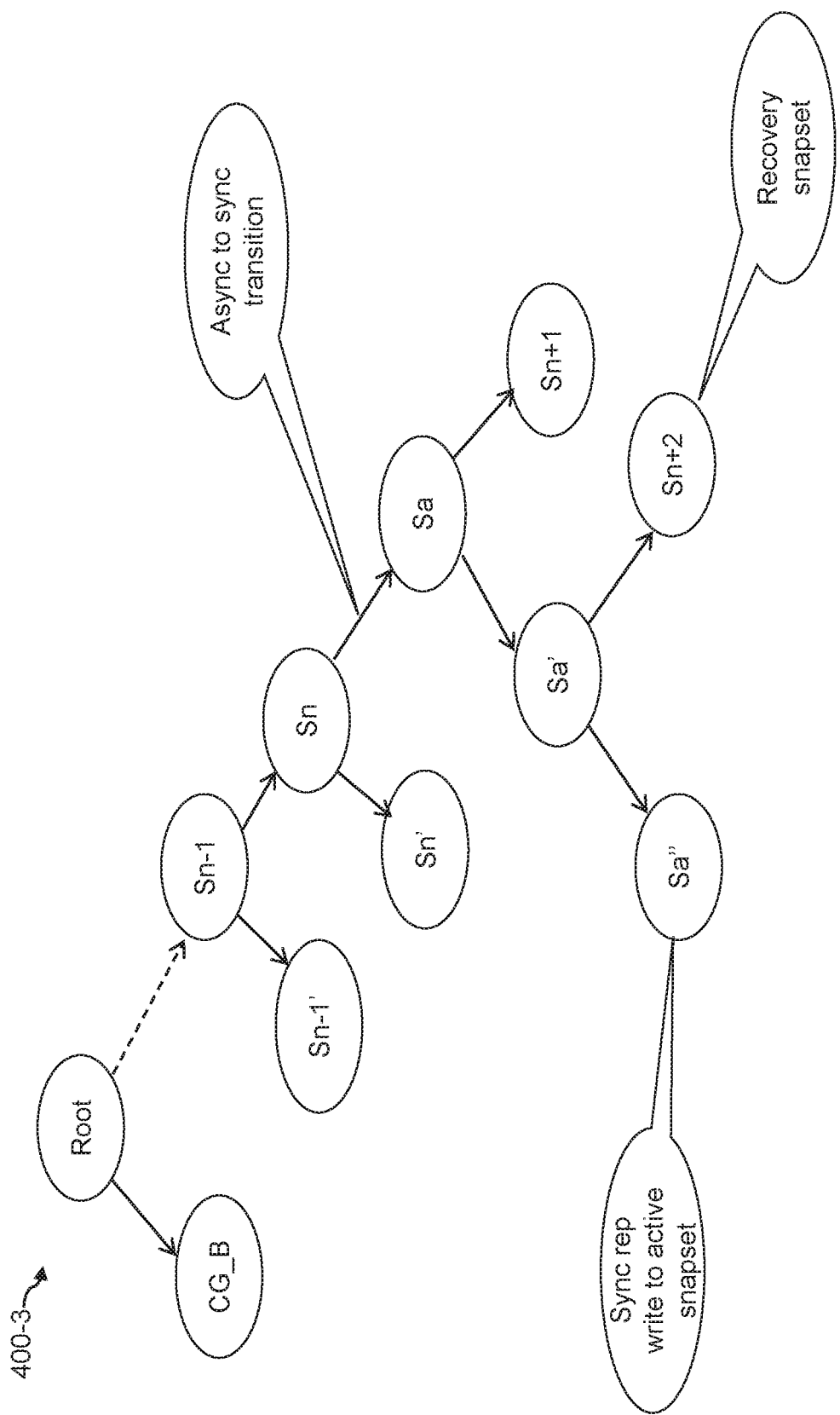

FIG. 4C shows an example of a snapshot tree 400-3 that illustrates a synchronous replication target such as CG_b of FIG. 2 prior to cascade replication. The snapshot tree 400-3 includes versions Sn−1 and Sn resulting from asynchronous writes, and these versions have corresponding snapshot sets Sn−1 and Sn' as shown. An asynchronous to synchronous transition occurs as illustrated, with the next version being denoted by active snapshot set Sa of the synchronous replication. Subsequent synchronous writes lead to further active snapshot sets Sa' and Sa" as shown. Additional snapshot sets Sn+1 and Sn+2 are generated from the respective active snapshot sets Sa and Sa' with the snapshot set Sn+2 illustratively serving as a recovery snapshot set. Synchronous replication writes in this example are made to the current active snapshot set as illustrated.

Figure 4D:
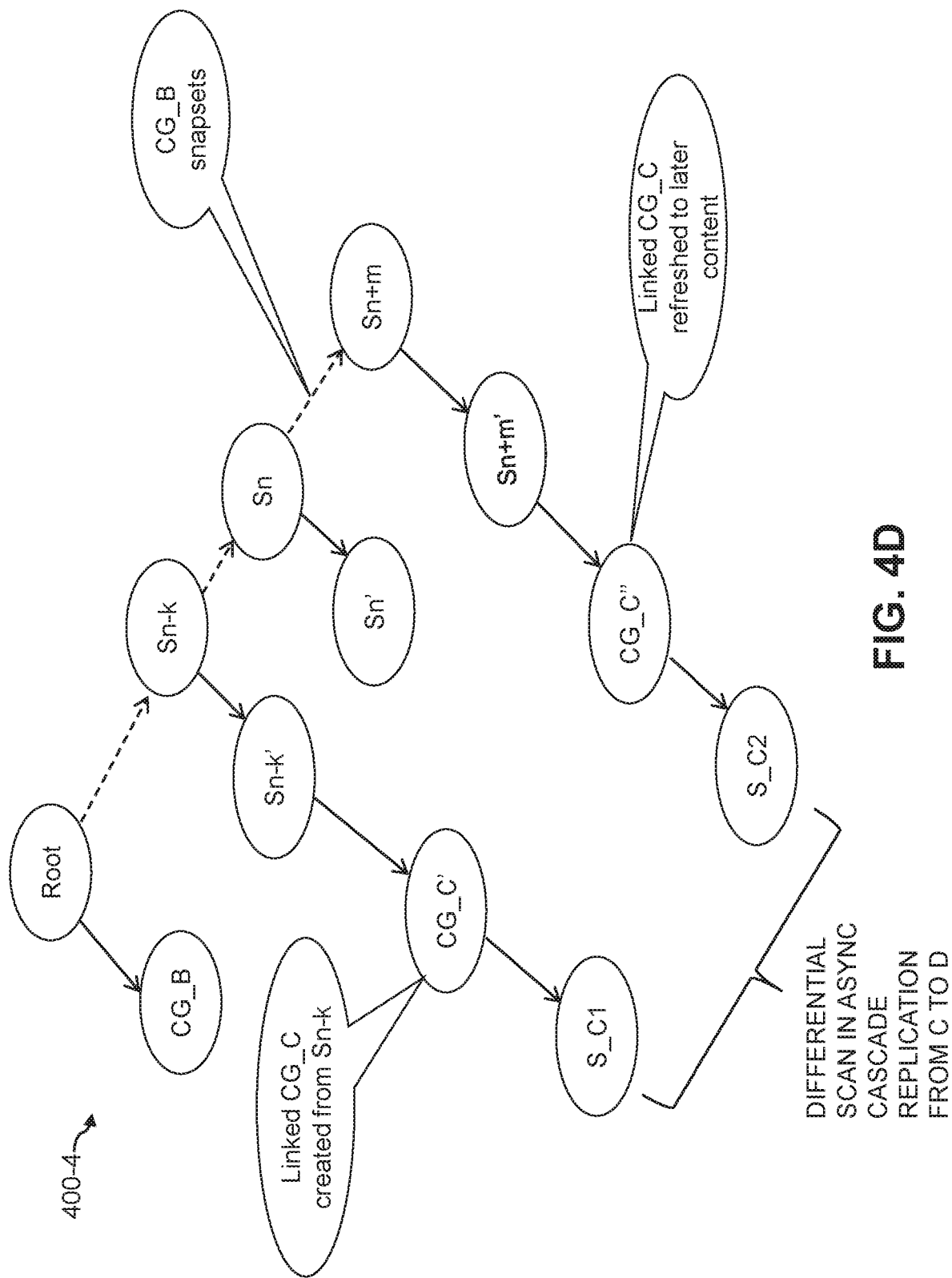

FIG. 4D shows an example of a snapshot tree 400-4 for cascade replication from a consistency group such as CG_c of FIG. 2 to a consistency group of a further storage system denoted as storage system D. In this example, it is assumed that the versions Sn−k, Sn and Sn+m comprise snapshot sets associated with CG_B and have been asynchronously replicated from B to C in the manner described elsewhere herein as part of an ongoing cascade replication process. Snapshots of the versions Sn−k, Sn and Sn+m are generated as respective snapshot sets Sn−k', Sn' and Sn+m' as indicated. An additional consistency group CG_C' linked to a consistency group CG_C is created from Sn−k using its snapshot set Sn−k', and subsequently refreshed to later content from Sn+m using its snapshot set Sn+m' thereby resulting in the updated consistency group denoted CG_C". Snapshot sets S_C1 and S_C2 are generated from CG_C' and CG_C" respectively and utilized in differential scanning as part of asynchronous replication from storage system C to storage system D.

It is to be appreciated that the snapshot tree arrangements of FIGS. 4A, 4B, 4C and 4D are presented by way of illustrative example only, and should not be construed as limiting in any way. Terms such as "root node" and "non-root node," "start node" and "stop node," and "first node" and "second node" as used herein are all intended to be broadly construed. A non-root node is considered to be any snapshot tree node that is not a root node. Start node and stop node designations for a given snapshot tree in some embodiments can be reversed relative to the designation arrangements referred to above in conjunction with the examples herein. Accordingly, such terms should not be construed as requiring a particular directionality for scanning the snapshot tree. It should also be understood that a wide variety of other snapshot tree arrangements may be used.

The FIG. 3 process is an example of what is more generally referred to herein as a cascade replication process in which one or more logical storage volumes are replicated from a first storage system to a second storage system in a first cascade replication stage, and from the second storage system to a third storage system in a second cascade replication stage. One or more additional replication stages involving respective additional storage systems may also be part of the cascade replication process.

As noted above, asynchronous replication in the FIG. 3 process illustratively makes use of efficient differential scanning techniques of the type described in the above-cited U.S. patent application Ser. No. 16/357,957. For example, such differential scanning arrangements allow for efficient differential scanning of non-ancestor snapshots that can arise when one or more storage volumes are restored from previous snapshots in an ongoing asynchronous replication process. Other types of differential scanning not involving the techniques disclosed in U.S. patent application Ser. No. 16/357,957 can be used to perform asynchronous replication in other embodiments.

The particular processing operations and other system functionality described in conjunction with the flow diagram of FIG. 3 are presented by way of illustrative example only, and should not be construed as limiting the scope of the disclosure in any way. Alternative embodiments can use other types of processing operations to provide cascade replication. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different cascade replication processes for respective different consistency groups comprising different sets of storage volumes or for different storage systems or portions thereof within a given information processing system.

Functionality such as that described in conjunction with the flow diagram of FIG. 3 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, storage controllers such as storage controllers 108 of storage systems 102 that are configured to control performance of one or more steps of the FIG. 3 process in their corresponding system 100 can be implemented as part of what is more generally referred to herein as a processing platform comprising one or more processing devices each comprising a processor coupled to a memory. A given such processing device may correspond to one or more virtual machines or other types of virtualization infrastructure such as Docker containers or Linux containers (LXCs). The storage controllers 108, as well as other system components, may be implemented at least in part using processing devices of such processing platforms. For example, in a distributed implementation of a given one of the storage controllers 108, respective distributed modules of such a storage controller can be implemented in respective containers running on respective ones of the processing devices of a processing platform.

In some implementations of the FIG. 3 process, the source and target storage systems comprise content addressable storage systems configured to maintain various metadata structures that are utilized in the differential scanning. Examples of metadata structures maintained by the source and target storage systems in illustrative embodiments include the logical layer and physical layer mapping tables described below. It is to be appreciated that these particular tables are only examples, and other tables or metadata structures having different configurations of entries and fields can be used in other embodiments.

An address-to-hash ("A2H") utilized in some embodiments comprises a plurality of entries accessible utilizing logical addresses as respective keys, with each such entry of the A2H table comprising a corresponding one of the logical addresses, a corresponding hash handle, and possibly one or more additional fields.

A hash-to-data ("H2D") table utilized in some embodiments comprises a plurality of entries accessible utilizing hash handles as respective keys, with each such entry of the H2D table comprising a corresponding one of the hash handles, a physical offset of a corresponding one of the data pages, and possibly one or more additional fields.

A hash metadata ("HMD") table utilized in some embodiments comprises a plurality of entries accessible utilizing hash handles as respective keys. Each such entry of the HMD table comprises a corresponding one of the hash handles, a corresponding reference count and a corresponding physical offset of one of the data pages. A given one of the reference counts denotes the number of logical pages in the storage system that have the same content as the corresponding data page and therefore point to that same data page via their common hash digest. The HMD table may also include one or more additional fields.

A physical layer based ("PLB") table utilized in some embodiments illustratively comprises a plurality of entries accessible utilizing physical offsets as respective keys, with each such entry of the PLB table comprising a corresponding one of the physical offsets, a corresponding one of the hash digests, and possibly one or more additional fields.

As indicated above, the hash handles are generally shorter in length than the corresponding hash digests of the respective data pages, and each illustratively provides a short representation of the corresponding full hash digest. For example, in some embodiments, the full hash digests are 20 bytes in length, and their respective corresponding hash handles are illustratively only 4 or 6 bytes in length.

Also, it is to be appreciated that terms such as "table" and "entry" as used herein are intended to be broadly construed, and the particular example table and entry arrangements described above can be varied in other embodiments. For example, additional or alternative arrangements of entries can be used.

In some embodiments, one or more of the storage systems 102 participating in a given cascade replication process each comprise a content addressable storage array or other type of content addressable storage system suitably modified to incorporate cascade replication functionality as disclosed herein.

An illustrative embodiment of such a content addressable storage system will now be described with reference to FIG. 5. In this embodiment, a content addressable storage system 505 comprises a plurality of storage devices 506 and an associated storage controller 508. The content addressable storage system 505 may be viewed as a particular implementation of a given one of the storage systems 102, and accordingly is assumed to be coupled to the other one of the storage systems 102 and to one or more host devices of a computer system within information processing system 100.

Although it is assumed that at least a subset of the storage systems 102 are content addressable storage systems in some embodiments, other types of storage systems can be used for at least one of a source storage system and a target storage system in other embodiments. For example, it is possible that at least one of the storage systems 102 in an illustrative embodiment need not be a content addressable storage system and need not include an ability to generate content-based signatures. In such an embodiment, at least portions of the cascade replication functionality of the one or more storage systems can be implemented in a host device.

The storage controller 508 in the present embodiment is configured to implement cascade replication functionality of the type previously described. For example, the content addressable storage system 505 illustratively participates as a source storage system in a synchronous or asynchronous replication process with a target storage system that may be implemented as another instance of the content addressable storage system 505.

The storage controller 508 includes distributed modules 512 and 514, which are configured to operate in a manner similar to that described above for respective corresponding replication control logic 112 and snapshot generators 114 of the storage controllers 108 of system 100. Module 512 is more particularly referred to as distributed replication control logic, and illustratively comprises multiple replication control logic instances on respective ones of a plurality of distinct nodes. Module 514 is more particularly referred to as a distributed snapshot generator, and illustratively comprises multiple snapshot generation instances on respective ones of the distinct nodes.

Figure 5:
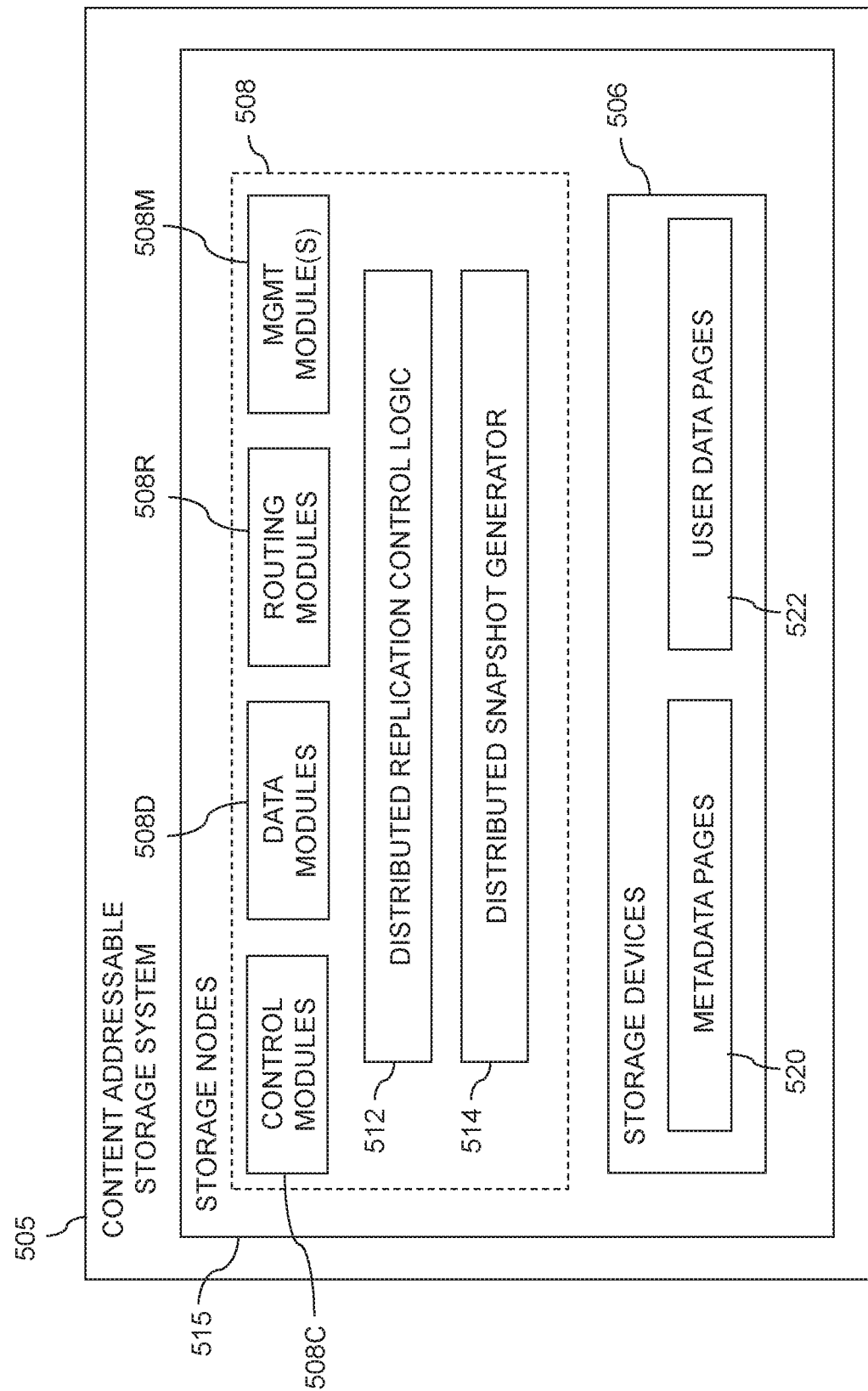
FIG. 5 shows a content addressable storage system having a distributed storage controller configured with functionality for cascade replication in an illustrative embodiment.

The content addressable storage system 505 in the FIG. 5 embodiment is implemented as at least a portion of a clustered storage system and includes a plurality of storage nodes 515 each comprising a corresponding subset of the storage devices 506. Such storage nodes 515 are examples of the "distinct nodes" referred to above, and other clustered storage system arrangements comprising multiple storage nodes and possibly additional or alternative nodes can be used in other embodiments. A given clustered storage system may therefore include not only storage nodes 515 but also additional storage nodes, compute nodes or other types of nodes coupled to network 104. Alternatively, such additional storage nodes may be part of another clustered storage system of the system 100. Each of the storage nodes 515 of the storage system 505 is assumed to be implemented using at least one processing device comprising a processor coupled to a memory.

The storage controller 508 of the content addressable storage system 505 is implemented in a distributed manner so as to comprise a plurality of distributed storage controller components implemented on respective ones of the storage nodes 515. The storage controller 508 is therefore an example of what is more generally referred to herein as a "distributed storage controller." In subsequent description herein, the storage controller 508 is referred to as distributed storage controller 508.

Each of the storage nodes 515 in this embodiment further comprises a set of processing modules configured to communicate over one or more networks with corresponding sets of processing modules on other ones of the storage nodes 515. The sets of processing modules of the storage nodes 515 collectively comprise at least a portion of the distributed storage controller 508 of the content addressable storage system 505.

The modules of the distributed storage controller 508 in the present embodiment more particularly comprise different sets of processing modules implemented on each of the storage nodes 515. The set of processing modules of each of the storage nodes 515 comprises at least a control module 508C, a data module 508D and a routing module 508R. The distributed storage controller 508 further comprises one or more management ("MGMT") modules 508M. For example, only a single one of the storage nodes 515 may include a management module 508M. It is also possible that management modules 508M may be implemented on each of at least a subset of the storage nodes 515. A given set of processing modules implemented on a particular one of the storage nodes 515 therefore illustratively includes at least one control module 508C, at least one data module 508D and at least one routing module 508R, and possibly a management module 508M.

Communication links may be established between the various processing modules of the distributed storage controller 508 using well-known communication protocols such as IP, Transmission Control Protocol (TCP), and remote direct memory access (RDMA). For example, respective sets of IP links used in data transfer and corresponding messaging could be associated with respective different ones of the routing modules 508R.

Although shown as separate modules of the distributed storage controller 508, the modules 512 and 514 in the present embodiment are assumed to be distributed at least in part over at least a subset of the other modules 508C, 508D, 508R and 508M of the storage controller 508. Accordingly, at least portions of the cascade replication functionality of the modules 512 and 514 may be implemented in one or more of the other modules of the storage controller 508. In other embodiments, the modules 512 and 514 may be implemented as stand-alone modules of the storage controller 508.

The storage devices 506 are configured to store metadata pages 520 and user data pages 522, and may also store additional information not explicitly shown such as checkpoints and write journals. The metadata pages 520 and the user data pages 522 are illustratively stored in respective designated metadata and user data areas of the storage devices 506. Accordingly, metadata pages 520 and user data pages 522 may be viewed as corresponding to respective designated metadata and user data areas of the storage devices 506.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 520 and the user data pages 522.

The user data pages 522 are part of a plurality of LUNs configured to store files, blocks, objects or other arrangements of data, each also generally referred to herein as a "data item," on behalf of users of the content addressable storage system 505. Each such LUN may comprise particular ones of the above-noted pages of the user data area. The user data stored in the user data pages 522 can include any type of user data that may be utilized in the system 100. The term "user data" herein is therefore also intended to be broadly construed.

A given storage volume for which content-based signatures are generated using modules 512 and 514 illustratively comprises a set of one or more LUNs, each including multiple ones of the user data pages 522 stored in storage devices 506.

The content addressable storage system 505 in the embodiment of FIG. 5 is configured to generate hash metadata providing a mapping between content-based digests of respective ones of the user data pages 522 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 522. The hash metadata generated by the content addressable storage system 505 is illustratively stored as metadata pages 520 in the metadata area. The generation and storage of the hash metadata is assumed to be performed under the control of the storage controller 508.

Each of the metadata pages 520 characterizes a plurality of the user data pages 522. For example, a given set of user data pages representing a portion of the user data pages 522 illustratively comprises a plurality of user data pages denoted User Data Page 1, User Data Page 2, . . . User Data Page n. Each of the user data pages in this example is characterized by a LUN identifier, an offset and a content-based signature. The content-based signature is generated as a hash function of content of the corresponding user data page. Illustrative hash functions that may be used to generate the content-based signature include the above-noted SHA1 secure hashing algorithm, or other secure hashing algorithms known to those skilled in the art, including SHA2, SHA256 and many others. The content-based signature is utilized to determine the location of the corresponding user data page within the user data area of the storage devices 506.

Each of the metadata pages 520 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 520 in an illustrative embodiment comprises metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the content addressable storage system 505 is illustratively distributed among the control modules 508C.

The cascade replication functionality provided by modules 512 and 514 in this embodiment is assumed to be distributed across multiple distributed processing modules, including at least a subset of the processing modules 508C, 508D, 508R and 508M of the distributed storage controller 508.

For example, the management module 508M of the storage controller 508 may include a replication control logic instance that engages corresponding replication control logic instances in all of the control modules 508C and routing modules 508R in order to implement an asynchronous replication process.

In some embodiments, the content addressable storage system 505 comprises an XtremIO™ storage array suitably modified to incorporate cascade replication functionality as disclosed herein.

In arrangements of this type, the control modules 508C, data modules 508D and routing modules 508R of the distributed storage controller 508 illustratively comprise respective C-modules, D-modules and R-modules of the XtremIO™ storage array. The one or more management modules 508M of the distributed storage controller 508 in such arrangements illustratively comprise a system-wide management module ("SYM module") of the XtremIO™ storage array, although other types and arrangements of system-wide management modules can be used in other embodiments. Accordingly, cascade replication functionality in some embodiments is implemented under the control of at least one system-wide management module of the distributed storage controller 508, utilizing the C-modules, D-modules and R-modules of the XtremIO™ storage array.

In the above-described XtremIO™ storage array example, each user data page has a fixed size such as 8 KB and its content-based signature is a 20-byte signature generated using the SHA1 secure hashing algorithm. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as the SHA1 secure hashing algorithm to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules. For example, if there are 1024 slices distributed evenly across the C-modules, and there are a total of 16 C-modules in a given implementation, each of the C-modules "owns" 1024/16=64 slices. In such arrangements, different ones of the slices are assigned to different ones of the control modules 508C such that control of the slices within the storage controller 508 of the storage system 505 is substantially evenly distributed over the control modules 508C of the storage controller 508.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Write requests processed in the content addressable storage system 505 each illustratively comprise one or more IO operations directing that at least one data item of the storage system 505 be written to in a particular manner. A given write request is illustratively received in the storage system 505 from a host device over a network. In some embodiments, a write request is received in the distributed storage controller 508 of the storage system 505, and directed from one processing module to another processing module of the distributed storage controller 508. For example, a received write request may be directed from a routing module 508R of the distributed storage controller 508 to a particular control module 508C of the distributed storage controller 508. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In the XtremIO™ context, the C-modules, D-modules and R-modules of the storage nodes 515 communicate with one another over a high-speed internal network such as an InfiniBand network. The C-modules, D-modules and R-modules coordinate with one another to accomplish various IO processing tasks.

The write requests from the host devices identify particular data pages to be written in the storage system 505 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The content addressable storage system 505 utilizes a two-level mapping process to map logical block addresses to physical block addresses. The first level of mapping uses an address-to-hash ("A2H") table and the second level of mapping uses a hash metadata ("HMD") table, with the A2H and HMD tables corresponding to respective logical and physical layers of the content-based signature mapping within the content addressable storage system 505. The HMD table or a given portion thereof in some embodiments disclosed herein is more particularly referred to as a hash-to-data ("H2D") table.

The first level of mapping using the A2H table associates logical addresses of respective data pages with respective content-based signatures of those data pages. This is also referred to as logical layer mapping.

The second level of mapping using the HMD table associates respective ones of the content-based signatures with respective physical storage locations in one or more of the storage devices 106. This is also referred to as physical layer mapping.

Examples of these and other metadata structures utilized in illustrative embodiments were described above in conjunction with FIG. 3. These particular examples include respective A2H, H2D, HMD and PLB tables. In some embodiments, the A2H and H2D tables are utilized primarily by the control modules 508C, while the HMD and PLB tables are utilized primarily by the data modules 508D.

For a given write request, hash metadata comprising at least a subset of the above-noted tables is updated in conjunction with the processing of that write request.

The A2H, H2D, HMD and PLB tables described above are examples of what are more generally referred to herein as "mapping tables" of respective distinct types. Other types and arrangements of mapping tables or other content-based signature mapping information may be used in other embodiments.

Such mapping tables are still more generally referred to herein as "metadata structures" of the content addressable storage system 505. It should be noted that additional or alternative metadata structures can be used in other embodiments. References herein to particular tables of particular types, such as A2H, H2D, HMD and PLB tables, and their respective configurations, should be considered non-limiting and are presented by way of illustrative example only. Such metadata structures can be implemented in numerous alternative configurations with different arrangements of fields and entries in other embodiments.

The logical block addresses or LBAs of a logical layer of the storage system 505 correspond to respective physical blocks of a physical layer of the storage system 505. The user data pages of the logical layer are organized by LBA and have reference via respective content-based signatures to particular physical blocks of the physical layer.

Each of the physical blocks has an associated reference count that is maintained within the storage system 505. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 508C, 508D, 508R and 508M as shown in the FIG. 5 embodiment is presented by way of example only. Numerous alternative arrangements of processing modules of a distributed storage controller may be used to implement cascade replication functionality in a clustered storage system in other embodiments.

Additional examples of content addressable storage functionality implemented in some embodiments by control modules 508C, data modules 508D, routing modules 508R and management module(s) 508M of distributed storage controller 508 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

Illustrative embodiments of a storage system with cascade replication functionality as disclosed herein can provide a number of significant advantages relative to conventional arrangements.

For example, some embodiments can perform cascade replication across any desired number of storage systems in a highly efficient manner while also ensuring consistency between replicated data on the multiple systems.

In addition, illustrative embodiments can accommodate situations in which one or more storage volumes of a consistency group are "refreshed" or otherwise restored to previous versions during an ongoing asynchronous replication process, using what is also referred to herein as "live" restoration of the one or more storage volumes.

Such arrangements therefore avoid the need to terminate and subsequently restart the replication process in order to restore one or more storage volumes of a consistency group using previous versions.

In some embodiments, the storage systems are illustratively implemented as respective content addressable storage systems, but in other embodiments one or more of the storage systems can instead be a traditional storage array, which does not support any type of content addressable storage functionality, with any missing functionality being provided by a host device.

Accordingly, cascade replication functionality as disclosed herein can be implemented in a storage system, in a host device, or partially in a storage system and partially in a host device.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with cascade replication functionality will now be described in greater detail with reference to FIGS. 6 and 7. Although described in the context of system 100, these platforms may also be used to implement at least portions of other information processing systems in other embodiments.

Figure 6:
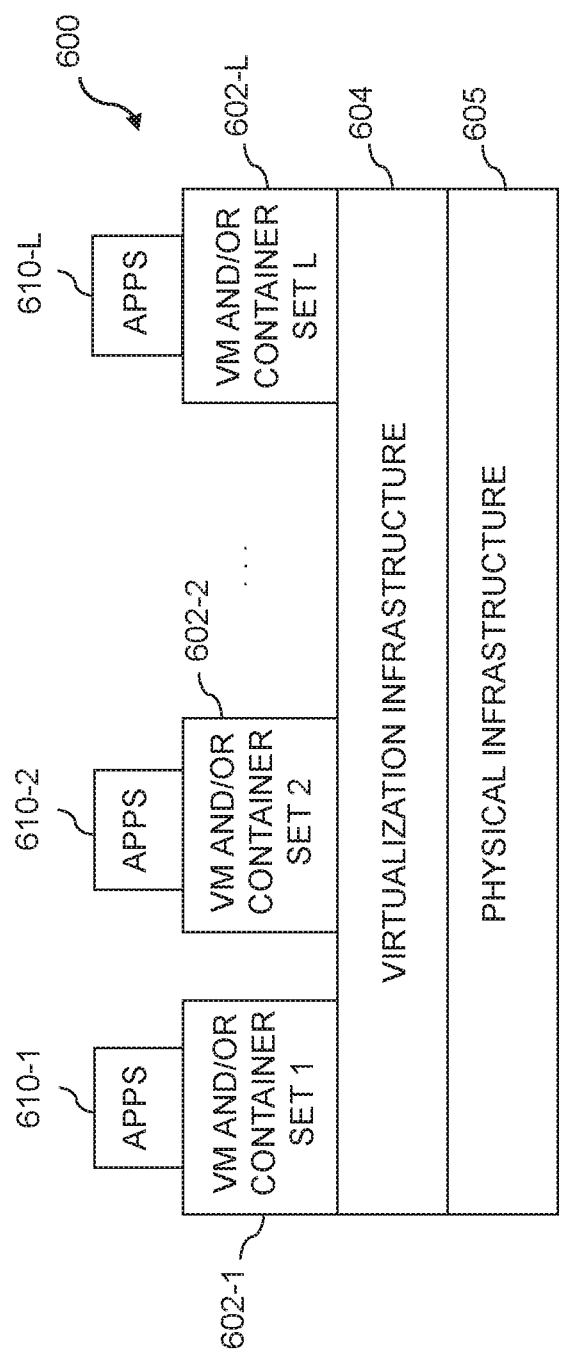
FIGS. 6 and 7 show examples of processing platforms that may be utilized to implement at least a portion of an information processing system in illustrative embodiments.
Figure 7:
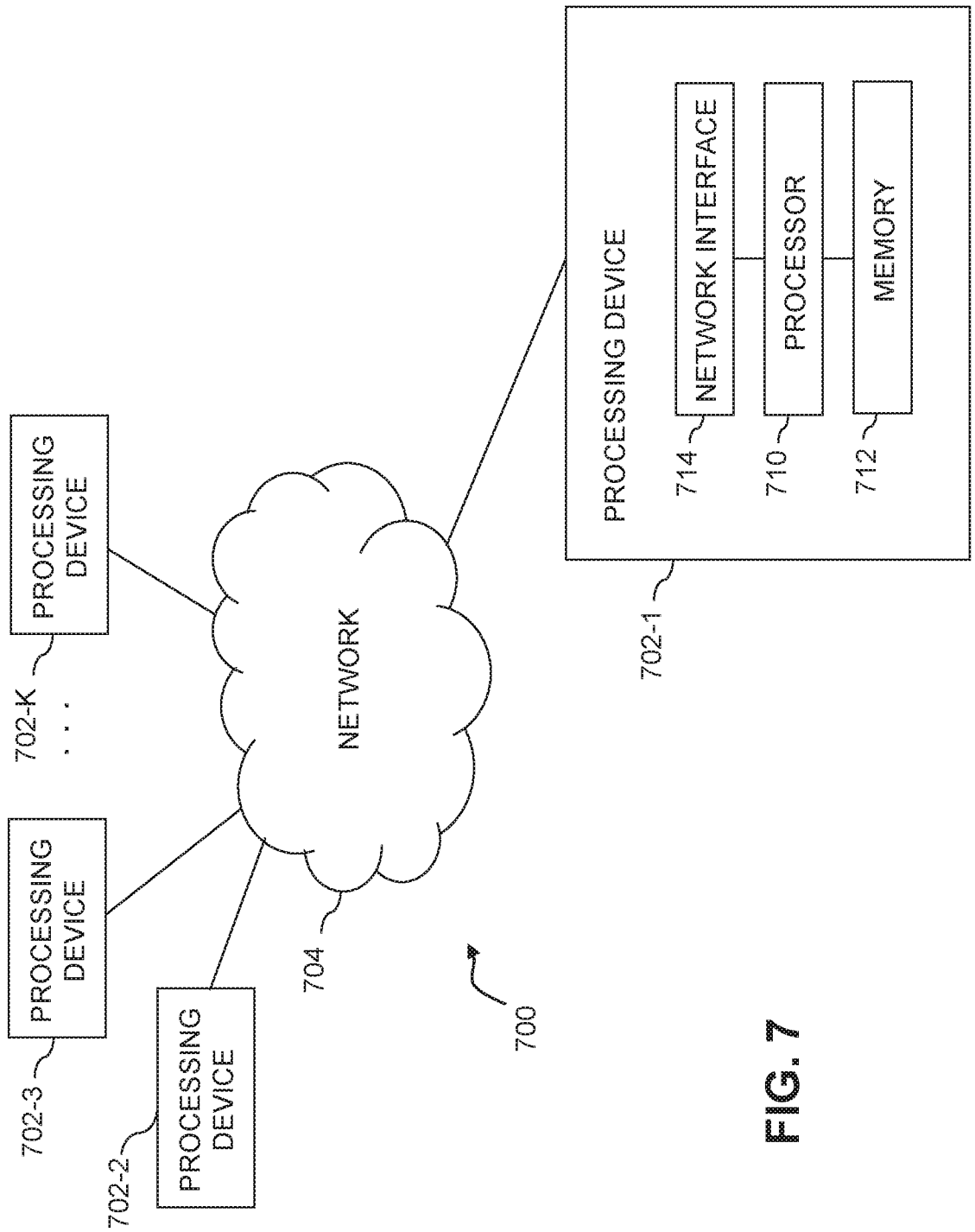

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide cascade replication functionality of the type described above for one or more processes running on a given one of the VMs. For example, each of the VMs can implement replication control logic and/or snapshot generators for providing cascade replication functionality in the system 100.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can also provide cascade replication functionality of the type described above. For example, a container host device supporting multiple containers of one or more container sets can implement one or more instances of replication control logic and/or snapshot generators for providing cascade replication functionality in the system 100.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™, or Vblock® converged infrastructure from Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the cascade replication functionality of one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, cascade replication processes, snapshot trees and associated control logic and metadata structures. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    at least one processing device comprising a processor coupled to a memory;
    said at least one processing device being configured:
    to initiate a first replication session to replicate data of a first consistency group in a first storage system to a second consistency group in a second storage system;
    to create an additional consistency group linked to the second consistency group in the second storage system;
    to initiate a second replication session to replicate data of the additional consistency group to another consistency group in a third storage system;
    to update the second consistency group based at least in part on an active snapshot set of the first replication session;
    to update the additional consistency group based at least in part on the second consistency group; and
    to replicate data of the additional consistency group to the other consistency group in the third storage system;
    wherein replicating data of the additional consistency group to the other consistency group in the third storage system comprises:
    generating a current snapshot set for the additional consistency group;
    scheduling a differential scan of the current snapshot set relative to a previous snapshot set generated for the additional consistency group; and
    performing the scheduled differential scan in a particular manner that is determined based at least in part on node ancestor relationships in one or more snapshot trees maintained for the additional consistency group.

2. The apparatus of claim 1 wherein said at least one processing device is implemented at least in part within one or more of the storage systems.

3. The apparatus of claim 2 wherein said at least one processing device comprises a storage controller of at least one of storage systems.

4. The apparatus of claim 1 wherein each of the consistency groups comprises a plurality of logical storage volumes.

5. The apparatus of claim 1 wherein the first replication session comprises one of a synchronous replication session and an asynchronous replication session, and the second replication session comprises an asynchronous replication session.

6. The apparatus of claim 1 wherein updating the additional consistency group based at least in part on the second consistency group comprises periodically updating the additional consistency group against the second consistency group.

7. The apparatus of claim 1 wherein updating the additional consistency group based at least in part on the second consistency group comprises one of:
    performing a snap-and-reassign operation for the additional consistency group using the second consistency group; and
    refreshing the additional consistency group using the second consistency group.

8. The apparatus of claim 1 wherein replicating data of the additional consistency group to the other consistency group in the third storage system further comprises:
    for each of one or more snapshot trees maintained for the additional consistency group:
    determining if a first node corresponding to the previous snapshot set is an ancestor of a second node corresponding to the current snapshot set; and
    selecting the particular manner in which to perform the scheduled differential scan for the snapshot tree responsive to a result of the determination.

9. The apparatus of claim 8 wherein the scheduled differential scan is performed in a given replication cycle of an asynchronous replication session and further wherein results of performing the scheduled differential scan are transmitted from the second storage system to the third storage system in the given replication cycle.

10. The apparatus of claim 8 wherein determining if a first node corresponding to the previous snapshot set is an ancestor of a second node corresponding to the current snapshot set comprises:
    inspecting a path from the second node towards a root node of the snapshot tree;
    responsive to the first node being part of the path, determining that the first node is an ancestor of the second node; and responsive to the first node not being part of the path, determining that the first node is not an ancestor of the second node.

11. The apparatus of claim 8 wherein selecting a particular manner in which to perform the scheduled differential scan for the snapshot tree responsive to a result of the determination comprises:

performing a first type of differential scan comprising aggregating node metadata of a path from the second node to the first node responsive to the first node being an ancestor of the second node; and performing a second type of differential scan different than the first type of differential scan responsive to the first node not being an ancestor of the second node.

12. The apparatus of claim 1 wherein the at least one processing device is further configured:

to create a further consistency group linked to the other consistency group in the third storage system; and to initiate a third replication session to replicate data of the further consistency group to another consistency group in a fourth storage system.

13. The apparatus of claim 1 wherein the first and second storage systems are part of a first data center, and the third storage system is part of a second data center remote from the first data center.

14. A method comprising:

initiating a first replication session to replicate data of a first consistency group in a first storage system to a second consistency group in a second storage system;

creating an additional consistency group linked to the second consistency group in the second storage system;

initiating a second replication session to replicate data of the additional consistency group to another consistency group in a third storage system;

updating the second consistency group based at least in part on an active snapshot set of the first replication session;

updating the additional consistency group based at least in part on the second consistency group; and replicating data of the additional consistency group to the other consistency group in the third storage system;

wherein replicating data of the additional consistency group to the other consistency group in the third storage system comprises:

generating a current snapshot set for the additional consistency group;

scheduling a differential scan of the current snapshot set relative to a previous snapshot set generated for the additional consistency group; and performing the scheduled differential scan in a particular manner that is determined based at least in part on node ancestor relationships in one or more snapshot trees maintained for the additional consistency group; and wherein the method is implemented by at least one processing device comprising a processor coupled to a memory.

15. The method of claim 14 wherein updating the additional consistency group based at least in part on the second consistency group comprises periodically updating the additional consistency group against the second consistency group.

16. A computer program product comprising a non-transitory processor-readable storage medium having stored therein program code of one or more software programs, wherein the program code when executed by at least one processing device causes said at least one processing device:

to initiate a first replication session to replicate data of a first consistency group in a first storage system to a second consistency group in a second storage system;

to create an additional consistency group linked to the second consistency group in the second storage system;

to initiate a second replication session to replicate data of the additional consistency group to another consistency group in a third storage system;

to update the second consistency group based at least in part on an active snapshot set of the first replication session;

to update the additional consistency group based at least in part on the second consistency group; and to replicate data of the additional consistency group to the other consistency group in the third storage system;

wherein replicating data of the additional consistency group to the other consistency group in the third storage system comprises:

generating a current snapshot set for the additional consistency group;

scheduling a differential scan of the current snapshot set relative to a previous snapshot set generated for the additional consistency group; and performing the scheduled differential scan in a particular manner that is determined based at least in part on node ancestor relationships in one or more snapshot trees maintained for the additional consistency group.

17. The computer program product of claim 16 wherein updating the additional consistency group based at least in part on the second consistency group comprises periodically updating the additional consistency group against the second consistency group.

18. The computer program product of claim 16 wherein replicating data of the additional consistency group to the other consistency group in the third storage system further comprises:

for each of one or more snapshot trees maintained for the additional consistency group:

determining if a first node corresponding to the previous snapshot set is an ancestor of a second node corresponding to the current snapshot set; and selecting the particular manner in which to perform the scheduled differential scan for the snapshot tree responsive to a result of the determination.

19. The computer program product of claim 18 wherein the scheduled differential scan is performed in a given replication cycle of an asynchronous replication session and further wherein results of performing the scheduled differential scan are transmitted from the second storage system to the third storage system in the given replication cycle.

20. The computer program product of claim 18 wherein determining if a first node corresponding to the previous snapshot set is an ancestor of a second node corresponding to the current snapshot set comprises:

inspecting a path from the second node towards a root node of the snapshot tree;

responsive to the first node being part of the path, determining that the first node is an ancestor of the second node; and responsive to the first node not being part of the path, determining that the first node is not an ancestor of the second node.

* * * * *